United States Patent
Parvulescu et al.

(10) Patent No.: US 10,442,697 B2
(45) Date of Patent: Oct. 15, 2019

(54) PROCESS FOR PREPARING A BORON CONTAINING ZEOLITIC MATERIAL HAVING MWW FRAMEWORK STRUCTURE

(71) Applicant: BASF SE, Ludwigshafen (DE)

(72) Inventors: Andrei-Nicolae Parvulescu, Heidelberg (DE); Ulrich Mueller, Neustadt (DE); Hans-Juergen Luetzel, Boehl-Iggelheim (DE); Georg Uhl, Kaiserslautern (DE); Robert Bayer, Sinsheim (DE); Regina Vogelsang, Ludwigshafen (DE); Robert Schlosser, Schifferstadt (DE); Franky Ruslim, Mannheim (DE); Pawel Czajka, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/007,724

(22) Filed: Jun. 13, 2018

(65) Prior Publication Data

US 2018/0362352 A1     Dec. 20, 2018

Related U.S. Application Data

(62) Division of application No. 14/765,471, filed as application No. PCT/EP2014/052203 on Feb. 5, 2014, now Pat. No. 10,046,974.

(30) Foreign Application Priority Data

Feb. 5, 2013   (EP) .................................... 13154025

(51) Int. Cl.
   *C01B 39/12*   (2006.01)
   *B01J 29/89*   (2006.01)
   (Continued)

(52) U.S. Cl.
   CPC ............ *C01B 39/12* (2013.01); *B01J 29/7038* (2013.01); *B01J 29/7088* (2013.01); *B01J 29/86* (2013.01);
   (Continued)

(58) Field of Classification Search
   CPC ......... C01B 39/12; C01B 39/46; C01B 39/48; C01B 37/007; C01B 39/085;
   (Continued)

(56) References Cited

U.S. PATENT DOCUMENTS

| 10,046,974 B2* | 8/2018 | Parvulescu | ........... C01B 37/007 |
| 2005/0158238 A1* | 7/2005 | Tatsumi | ................ C01B 37/005 |
| | | | 423/702 |

(Continued)

FOREIGN PATENT DOCUMENTS

| CN | 1639065 A | 7/2005 |
| CN | 101163546 A | 4/2008 |

(Continued)

OTHER PUBLICATIONS

International Search Report dated Apr. 2, 2014 in PCT/EP2014/052203.

(Continued)

*Primary Examiner* — David M Brunsman
(74) *Attorney, Agent, or Firm* — Oblon, McClelland, Maier & Neustadt, L.L.P.

(57) ABSTRACT

A process for preparing an aluminum-free boron containing zeolitic material comprising the framework structure MWW (BMWW), comprising (a) hydrothermally synthesizing the BMWW from a synthesis mixture containing water, a silicon source, a boron source, and an MWW template compound obtaining the BMWW in its mother liquor, the mother liquor having a pH above 9; (b) adjusting the pH of the mother liquor, obtained in (a) and containing the BMWW, to a value (Continued)

in the range of from 6 to 9; (c) separating the BMWW from the pH-adjusted mother liquor obtained in (b) by filtration in a filtration device.

5 Claims, 11 Drawing Sheets

(51) Int. Cl.
*B01J 29/86* (2006.01)
*C01B 39/48* (2006.01)
*B01J 29/70* (2006.01)
*C01B 39/08* (2006.01)
*C01B 37/00* (2006.01)
*B01J 37/00* (2006.01)
*B01J 37/04* (2006.01)
*B01J 37/06* (2006.01)
*B01J 37/08* (2006.01)
*B01J 37/10* (2006.01)
*C01B 39/46* (2006.01)

(52) U.S. Cl.
CPC .............. *B01J 29/89* (2013.01); *B01J 37/009* (2013.01); *B01J 37/04* (2013.01); *B01J 37/06* (2013.01); *B01J 37/08* (2013.01); *B01J 37/10* (2013.01); *C01B 37/007* (2013.01); *C01B 39/085* (2013.01); *C01B 39/46* (2013.01); *C01B 39/48* (2013.01); *C01P 2002/70* (2013.01); *C01P 2006/12* (2013.01); *C01P 2006/90* (2013.01)

(58) Field of Classification Search
CPC ......... C01B 37/005; B01J 29/86; B01J 29/89; B01J 29/7088; B01J 37/0072; B01J 37/04; B01J 37/06; B01J 29/7038; B01J 37/10; C01P 2006/12; C01P 2006/90; C01P 2002/70
See application file for complete search history.

(56) References Cited

U.S. PATENT DOCUMENTS

| | | |
|---|---|---|
| 2005/0209091 A1 | 9/2005 | Tatsumi et al. |
| 2006/0182681 A1 | 8/2006 | Kumar et al. |
| 2006/0239906 A1 | 10/2006 | Mueller et al. |
| 2007/0154388 A1 | 7/2007 | Muller et al. |
| 2009/0270245 A1 | 10/2009 | Kumar et al. |
| 2011/0076229 A1* | 3/2011 | Trukhan ............ B01D 53/9418 423/703 |
| 2011/0312406 A1 | 12/2011 | Bigelow, Jr. |
| 2011/0312486 A1* | 12/2011 | Yilmaz ................. B01J 20/186 502/60 |

FOREIGN PATENT DOCUMENTS

| | | |
|---|---|---|
| EP | 1 324 998 A | 7/2003 |
| JP | 2011-521871 | 7/2011 |
| RU | 2 353 580 C2 | 4/2009 |
| WO | WO 03/074421 A1 | 9/2003 |
| WO | WO 03/074422 A1 | 9/2003 |
| WO | WO 2006/070073 A1 | 7/2006 |
| WO | WO 2006/111584 A1 | 10/2006 |

OTHER PUBLICATIONS

International Preliminary Report on Patentability and Written Opinion dated Aug. 20, 2015 in PCT/EP2014/052203 (English translation only).
Combined Chinese Office Action and Search Report dated Jun. 1, 2016 in Chinese Patent Application No. 201480016861.7 (with partial English language translation and English translation of categories of cited documents).
Office Action dated Feb. 6, 2018, in Japanese Patent Application No. 2015-556476.

* cited by examiner

PROCESS FOR PREPARING A BORON CONTAINING ZEOLITIC MATERIAL HAVING MWW FRAMEWORK STRUCTURE

CROSS-REFERENCE TO RELATED APPLICATIONS

This application is a divisional application of U.S. application Ser. No. 14/765,471, filed on Aug. 3, 2015, which is a national stage entry application of PCT/EP2014/052203, filed on Feb. 5, 2014, the text of which is incorporated by reference, and claims foreign priority to EP 13154025.4, filed on Feb. 5, 2013, the entire contents of which are incorporated herein by reference.

BACKGROUND

The present invention relates to a process for preparing an aluminum-free boron containing zeolitic material having an MWW framework structure, referred to hereinafter as BMWW, wherein after the hydrothermal synthesis of the precursor of the BMWW, said precursor is separated from the mother liquor by filtration in a filtration device. Prior to said filtration, the pH of the mother liquor is suitably adjusted. Further, the present invention relates to an aluminum-free boron containing zeolitic material comprising the framework structure MWW, an aqueous suspension which contains as-synthesized BMWW precursor primary crystallites, and a filter cake containing as-synthesized BMWW precursor primary crystallites. Yet further, the present invention relates to a use of the aluminum-free boron containing zeolitic material comprising the framework structure MWW.

Boron containing zeolitic materials of zeolite framework structure type MWW (BMWW) are used as precursor compounds for the preparation of titanium containing zeolitic materials of zeolite framework structure type MWW (TiMWW) which in turn are mainly used as oxidation catalysts, in particular as epoxidation catalysts. Such oxidation catalysts are employed in industrial-scale processes, and consequently, there is a need for economically advantageous processes for the preparation of these TiMWW catalysts and the respective BMWW precursor which have to be prepared in large quantities.

The process for the preparation of BMWW usually includes the hydrothermal synthesis of a BMWW precursor starting from a silicon source, a boron source, and a template compound allowing to obtain the BMWW precursor from the hydrothermal synthesis. The thus obtained mother liquor containing the primary crystals of the BMWW precursor is subjected to filtration and usually washing in order to separate the BMWW precursor from the mother liquor. Such filtration is described, for example, in WO 03/074421 A1, in Example 1. According to this teaching, the solid product obtained from hydrothermal synthesis is separated by filtration and washed with ion exchanged water. The same disclosure can be found in Example 1 of WO 03/074422 A1.

Now, it was found that this filtration of the BMWW precursor usually takes considerable time and thus represents an unfavorable step, especially in case large quantities of the BMWW and thus of the BMWW precursor are to be produced. Further, once the respective filter cake has been obtained, it was found that washing this filter cake represents yet another very time consuming step of the process since the filter cake usually is very compact, exhibiting a very high washing resistance. Both the problems regarding the filtration of the mother liquor containing the BMWW precursor and the usually applied further step of washing the respectively obtained filter cake containing the BMWW precursor lead to a major disadvantage of this undoubtedly established process.

SUMMARY

Therefore, it was an object of the present invention to provide an improved process for the preparation of BMWW, in particular an improved industrial-scale process for the preparation of BMWW.

It was a further object of the present invention to provide a suspension containing as-synthesized BMWW precursor, said suspension having improved processability characteristics.

It was a yet further object of the present invention to provide a filter cake containing as-synthesized BMWW precursor, said filter cake having improved processability characteristics.

Surprisingly, it was found that the objects of the present invention can be solved if the pH of the mother liquor which is obtained from the hydrothermal synthesis of a BMWW precursor is suitably adjusted before the mother liquor containing the BMWW precursor is subjected to filtration. In particular, it was found that the filtration characteristics of said mother liquor can be significantly improved. Further, it was found that not only the filtration characteristics, but also the washing characteristics of the filter cake obtained from said filtration can be significantly improved. In particular, it was found that the process of the present invention leads to a major decrease in the filtration resistance of said mother liquor containing the BMWW precursor, and yet further to an even more pronounced decrease in the washing resistance of said filter cake containing the BMWW precursor.

DETAILED DESCRIPTIONS

Figure 1:
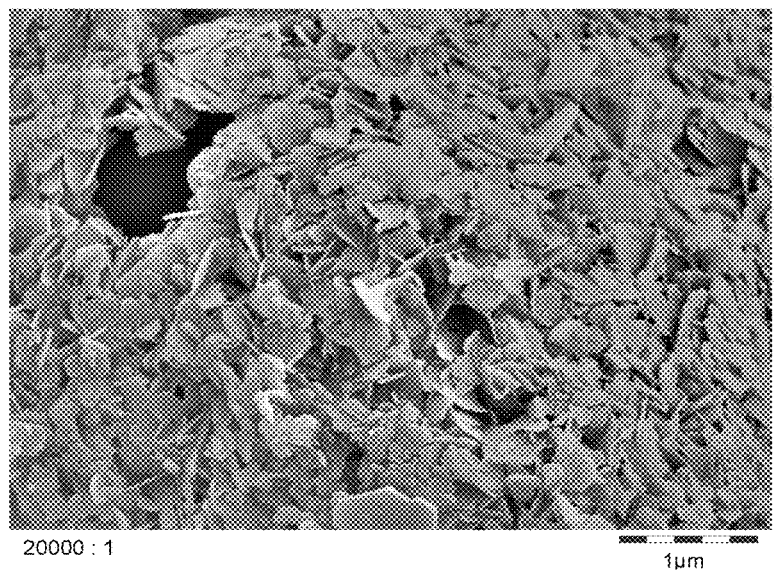
FIG. 1 shows a 20000:1 Scanning Electron Microscopy picture (secondary electron picture at 5 kV) of the spray-dried and calcined B-MWW material as obtained according to Example 1.

Therefore, the present invention relates to a process for preparing an aluminum-free boron containing zeolitic material comprising the framework structure MWW (BMWW), comprising
(a) hydrothermally synthesizing a BMWW precursor from a synthesis mixture containing water, a silicon source, a boron source, and an MWW template compound obtaining the BMWW precursor in its mother liquor, the mother liquor having a pH above 9;
(b) adjusting the pH of the mother liquor, obtained in (a) and containing the BMWW precursor, to a value in the range of from 6 to 9;
(c) separating the BMWW precursor from the pH-adjusted mother liquor obtained in (b) by filtration in a filtration device.

Further, the present invention relates to an aqueous suspension, containing as-synthesized BMWW precursor primary crystallites and the MWW template compound used for the synthesis of the BMWW primary crystallites, said suspension having a filtration resistance in the range of from 10 to 100 mPa*s/m$^2$. Preferably, the present invention relates to an aqueous suspension, containing as-synthesized BMWW precursor primary crystallites and the MWW template compound used for the synthesis of the BMWW primary crystallites, said suspension having a filtration resistance in the range of from 10 to 50 mPa*s/m$^2$.

Further, the present invention relates to a filter cake, containing as-synthesized BMWW precursor primary crystallites and the MWW template compound used for the synthesis of the BMWW primary crystallites, said filter cake having a washing resistance in the range of from 10 to 200 mPa*s/m$^2$. Preferably, the present invention relates to a filter cake, containing as-synthesized BMWW precursor primary crystallites and the MWW template compound used for the synthesis of the BMWW primary crystallites, said filter cake having a washing resistance in the range of from 10 to 50 mPa*s/m$^2$.

Step (a)

According to step (a), a BMWW is hydrothermally crystallized from a synthesis mixture. While it is generally conceivable that in step (a), a BMWW precursor is prepared which contains, in addition to boron, silicon and oxygen, other elements such as titanium and that therefore, the synthesis mixture may contain a source of this other elements such as a titanium source, it is preferred that the BMWW precursor contains essentially no elements other than boron, silicon, and oxygen.

Therefore, it is preferred that in (a), at least 95 weight-%, preferably at least 99 weight-%, more preferably at least 99.9 weight-%, more preferably at least 99.99 weight-%, more preferably at least 99.999 weight-% of the synthesis mixture consist of the water, the silicon source, the boron source, and the MWW template compound.

According to the present invention, an aluminum-free BMWW is prepared. The term "aluminum-free" as used in this context of the present invention relates to a BMWW which may contain aluminum only in traces as impurities which may result, for example, from aluminum impurities in the starting materials present in the synthesis mixture in (a), that is as impurities in the silicon source, the boron source, the template compound, an aluminum containing apparatus, and the water. In particular, no aluminum source is used in the synthesis mixture in (a).

Further preferably, the synthesis mixture in (a) contains no source of alkali metal. Further preferably, the synthesis mixture in (a) contains no source of alkaline earth metal. Therefore, the synthesis mixture in (a) is preferably free of alkali metal or free of alkaline earth metal, more preferably free of alkali metal and free of alkaline earth metal. The term "free of alkali metal" as used in this context of the present invention relates to a synthesis mixture which may contain alkali metal only in traces as impurities which may result, for example, from alkali metal impurities in the starting materials present in the synthesis mixture in (a), that is as impurities in the silicon source, the boron source, the template compound, and the water. The term "free of alkaline earth metal" as used in this context of the present invention relates to a synthesis mixture which may contain alkaline earth metal only in traces as impurities which may result, for example, from alkaline earth metal impurities in the starting materials present in the synthesis mixture in (a), that is as impurities in the silicon source, the boron source, the template compound, an aluminum containing apparatus, and the water.

The silicon source of the synthesis mixture in (a) is preferably selected from the group consisting of fumed silica, colloidal silica, and a mixture thereof, the silicon source preferably being colloidal silica, more preferably ammonia-stabilized silica such as Ludox® AS-40.

The boron source of the synthesis mixture in (a) is preferably selected from the group consisting of boric acid, borates, boron oxide, and a mixture of two or more thereof, the boron source preferably being boric acid.

The MWW template compound of the synthesis mixture in (a) is preferably selected from the group consisting of piperidine, hexamethylene imine, N,N,N,N',N',N'-hexamethyl-1,5-pentanediammonium ion, 1,4-bis(N-methylpyrrolidinium) butane, octyltrimethylammonium hydroxide, heptyltrimethylammonium hydroxide, hexyltrimethylammonium hydroxide, N,N,N-trimethyl-1-adamantylammonium hydroxide, and a mixture of two or more thereof, the MWW template compound preferably being piperidine.

Therefore, it is preferred that in (a), at least 95 weight-%, preferably at least 99 weight-%, more preferably at least 99.9 weight-%, more preferably at least 99.99 weight-%, more preferably at least 99.999 weight-% of the synthesis mixture consist of the water, the ammonia-stabilized silica as the silicon source, the boric acid as the boron source, and the piperidine as the MWW template compound.

As far as the mixing sequence of the components of the synthesis mixture is concerned, no specific restrictions exist. Preferably, the silicon source is added as the last component of the synthesis mixture. Therefore, it is preferred to add the boron source to the water, admix the MWW template compound to this mixture, and then add the silicon source. Therefore, it is also preferred to add the MWW template compound to the water, admix the boron source to this mixture, and then add the silicon source. It is preferred that during the preparation of the synthesis mixture, the mixture is at least partially suitably stirred. Depending on the scale of the process, it may be advantageous that after having added a given component of the synthesis mixture, the mixture is stirred for a certain period of time before the next component is added. During the preparation of the synthesis mixture, it is conceivable to cool or heat the mixture or to keep the temperature of the mixture essentially constant. Heating, cooling, or keeping the temperature essentially constant can be achieved by suitably choosing the temperature of the individual components to be added to the mixture and/or by controlling the temperature of the mixture and suitably heating or cooling the mixture indirectly, for example using a vessel in which the components are admixed which vessel has a jacket through which a cooling medium or a heating medium can be passed. Preferably, the synthesis mixture is prepared at a temperature of the mixture in the range of from 10 to 50° C., preferably from 20 to 40° C.

Preferably, the synthesis mixture according to (a) which is subjected to hydrothermal synthesis conditions contains the boron source, calculated as elemental boron, relative to the silicon source, calculated as elemental silicon, in a molar ratio in the range of from 0.4:1 to 2.0:1, preferably from 0.6:1 to 1.9:1, more preferably from 0.9:1 to 1.4:1. Conceivable preferred ranges are from 0.9:1 to 1.1:1 or from 1.0:1 to 1.2:1 or from 1.1:1 to 1.3:1 or from 1.2:1 to 1.4:1.

Preferably, the synthesis mixture according to (a) which is subjected to hydrothermal synthesis conditions contains the water relative to the silicon source, calculated as elemental silicon, in a molar ratio in the range of from 1:1 to 30:1, preferably from 3:1 to 25:1, more preferably from 6:1 to 20:1. Conceivable preferred ranges are from 6:1 to 10:1 or from 8:1 to 12:1 or from 10:1 to 14:1 or from 12:1 to 16:1 or from 14:1 to 18:1 or from 16:1 to 20:1.

Preferably, the synthesis mixture according to (a) which is subjected to hydrothermal synthesis conditions contains the MWW template compound relative to the silicon source, calculated as elemental silicon, in a molar ratio in the range of from 0.4:1 to 2.0:1, preferably from 0.6:1 to 1.9:1, more preferably from 0.9:1 to 1.4:1. Conceivable preferred ranges are from 0.9:1 to 1.1:1 or from 1.0:1 to 1.2:1 or from 1.1:1 to 1.3:1 or from 1.2:1 to 1.4:1.

Therefore, its is preferred that in (a), the synthesis mixture contains the boric acid as the boron source, calculated as elemental boron, relative to the ammonia-stabilized silica as the silicon source, calculated as elemental silicon, in a molar ratio in the range of from 0.4:1 to 2.0:1, preferably from 0.6:1 to 1.9:1, more preferably from 0.9:1 to 1.4:1, the water relative to the ammonia-stabilized silica as the silicon source, calculated as elemental silicon, in a molar ratio in the range of from 1:1 to 30:1, preferably from 3:1 to 25:1, more preferably from 6:1 to 20:1; and the piperidine as the MWW template compound relative to the ammonia-stabilized silica as the silicon source, calculated as elemental silicon, in a molar ratio in the range of from 0.4:1 to 2.0:1, preferably from 0.6:1 to 1.9:1, more preferably from 0.9:1 to 1.4:1.

In (a), the BMWW precursor is prepared from the synthesis mixture by subjecting the synthesis mixture to hydrothermal synthesis conditions. Thus, it is preferred to crystallize the BMWW precursor from the synthesis mixture in a suitable vessel under autogenous pressure at suitable temperatures. Preferably, the hydrothermal synthesizing in (a) is carried out at a temperature of less than 180° C., more preferably in the range of from 160 to less than 180° C., more preferably from 160 to 179° C., more preferably 165 to 178° C., more preferably from 170 to 177° C. Conceivable preferred ranges are from 170 to 174° C. or from 171 to 175° C. or from 172 to 176° C. or from 173 to 177° C. The range of from 174 to 176° C. is especially preferred.

Preferably, the synthesis mixture is heated to the preferred hydrothermal synthesis temperature at a heating ramp in the range of from 0.1 to 2 K/min, preferably from 0.15 to 1.5 K/min, more preferably from 0.2 to 1 K/min. Conceivable preferred ranges are from 0.15 to 0.35 K/min or from 0.25 to 0.45 K/min or from 0.35 to 0.55 K/min or from 0.45 to 0.65 or from 0.55 to 0.75 K/min. During the heating of the synthesis mixture to the hydrothermal synthesis temperature, it is preferred that the mixture is at least partially suitably stirred.

Preferably, the mixture is kept at the hydrothermal synthesis temperature for a sufficient period of time, such as up to 10 days like from 3 to 8 days or from 4 to 6 days. Surprisingly, it was found that for the above described synthesis mixture and the above described synthesis conditions, considerably shorter periods of time can be realized. Therefore, preferred periods of time are in the range of from 1 to 72 h, preferably from 6 to 60 h, more preferably from 12 to 50 h. During the hydrothermal synthesis, it is preferred that the mixture is at least partially suitably stirred.

Therefore, in (a), the hydrothermal synthesizing is preferably carried out at a temperature in the range of from 160 to less than 180° C., preferably from 170 to 177° C., for a period of time in the range of from 1 to 72 h, preferably from 6 to 60 h, more preferably from 12 to 50 h.

Generally, it is possible that a seeding material is added to the synthesis mixture. It was found that the addition of this seeding material may decrease the period of time for which the synthesis mixture is subjected to hydrothermal synthesis conditions. Preferred ranges are from 1 to 48 h, preferably from 6 to 32 h, more preferably from 12 to 24 h. If a seeding material is employed, it is preferred that the synthesis mixture in (a) contains the seeding material, relative to the silicon source, in a weight ratio in the range of from 0.01:1 to 1:1, preferably from 0.02:1 to 0.5:1, more preferably from 0.03:1 to 0.1:1, calculated as amount of seeding material in kg relative to silicon contained in the silicon source calculated as silicon dioxide in kg. Concerning the type of seeding material, it is preferred to employ a zeolitic material of zeolitic structure type MWW, preferably an aluminum-free zeolitic material of zeolitic structure type MWW, more preferably a boron containing aluminum-free zeolitic material of zeolitic structure type MWW. More preferably, if a seeding material is employed, the seeding material is prepared according to the process of the present invention, in particular according to the most preferred process of the present invention. Further, it may be conceivable to employ a BMWW precursor, preferably prepared according to the process of the present invention and obtained, for example, from the filtration step (c) in the form of a filter cake or from the washing step (d) in the form of a washed filter cake as described hereinafter or from the drying step (e) in the form of a dried, preferably washed filter cake as described hereinafter.

After the hydrothermal synthesis, the mother liquor containing the as-synthesized BMWW precursor primary crystallites is preferably suitably cooled. Preferably, the synthesis mixture is cooled at a cooling ramp in the range of from 0.1 to 2 K/min, preferably from 0.15 to 1.5 K/min, more preferably from 0.2 to 1.25 K/min. Depending on the volume of mixture to be cooled, and in particular as far as large volumes are concerned, cooling ramps of from 0.25 to 0.75 K/min are preferred, more preferably of from 0.25 to 0.55 K/min. Conceivable preferred ranges are from 0.25 to 0.35 K/min or from 0.3 to 0.4 K/min or from 0.35 to 0.45 or from 0.4 to 0.5 K/min or from 0.45 to 0.55 K/min. During the cooling of the mother liquor containing the BMWW precursor, it is preferred that the mixture is at least partially suitably stirred. Depending on the temperatures to be applied in the subsequent step (b) of the process of the invention, the mother liquor containing the BMWW precursor can be cooled to any desired temperature. Preferred temperatures are in the range of from 20 to 70° C., preferably from 30 to 65° C., more preferably from 40 to 60° C. Conceivable preferred ranges are from 40 to 50° C. or from 45 to 55° C. or from 50 to 60° C.

According to the present invention, the pH of the mother liquor obtained in (a), containing the BMWW precursor, has a pH above 9, as determined via a pH sensitive glass electrode and at the temperature to which the mother liquor containing the BMWW precursor has been cooled. Preferably, the pH of the mother liquor obtained from (a) is above 9.5, more preferably in the range of from 10 to 12.5, more preferably from 10.5 to 12, more preferably from 11 to 11.5. Conceivable preferred ranges are from 11 to 11.2 or from 11.1 to 11.3 or from 11.2 to 11.4 or from 11.3 to 11.5.

Step (b)

According to step (b) of the process of the invention, the pH of the mother liquor, obtained in (a) and containing the BMWW precursor, is adjusted to a value in the range of from 6 to 9. Preferably, the pH of the mother liquor, obtained in (a) and containing the BMWW precursor, is adjusted to a value in the range of from 6.5 to 8.5, preferably from 7 to 8.

Preferably, the pH is adjusted by adding at least one acid to the mother liquor containing the BMWW precursor. Generally, it is conceivable to add at least one acid and at least one base to the mother liquor containing the BMWW precursor, provided that the pH is adjusted to the above described values. Preferably, at least one acid is added in a suitable amount. During the adding of the at least one acid or of the at least one acid and at least one base, it is preferred to suitably at least partially stir the mother liquor.

Therefore, the present invention relates to the above-described process, wherein in (b), the pH is adjusted by a method comprising (i) adding an acid to the mother liquor obtained from (a) containing the BMWW precursor, wherein the adding is preferably carried out at least partially under stirring.

While there are no specific restrictions concerning the temperature at which the adding in (b) is carried out, it is preferred that the adding is carried out at a temperature of the mother liquor in the range of from 10 to 70° C., more preferably from 20 to 70° C., more preferably from 25 to 70° C., more preferably from 25 to 65° C., more preferably from 30 to 65° C., more preferably from 35 to 65° C., more preferably from 35 to 60° C., more preferably from 40 to 60° C. Conceivable preferred ranges are from 40 to 50° C. or from 45 to 55° C. or from 50 to 60° C. During the adding, it is conceivable to cool or heat the mixture or to keep the temperature of the mixture essentially constant. Heating, cooling, or keeping the temperature essentially constant can be achieved by suitably choosing the temperature of the components to be added to the mixture and/or by controlling the temperature of the mixture and suitably heating or cooling the mixture indirectly, for example using a vessel in which the components are admixed which vessel has a jacket through which a cooling medium or a heating medium can be passed.

The acid which is added according to step (b) is not subject to any specific restrictions. An inorganic acid, a mixture of two or more inorganic acids, an organic acid, a mixture of two or more organic acids, and a mixture of one or more inorganic acids and one or more an organic acids can be added. If two or more different acids are added, it is possible to add them simultaneously or suitably sequentially. Conceivable organic acids include formic acid, acetic acid, propionic acid, oxalic acid, or tartaric acid. Preferably, the acid which is added in (b) is not an organic acid. Preferably, an inorganic acid or a mixture of two or more inorganic acids is added. Preferably, the inorganic acid is selected from the group consisting of phosphoric acid, sulphuric acid, hydrochloric acid, nitric acid, and a mixture of two or more thereof, the inorganic acid preferably being nitric acid.

The at least one acid which is added in (b) is preferably added as a solution, which solution more preferably is a solution comprising water as solvent. Even more preferably, the solvent comprises water. Therefore, the at least one acid is added in the form of an aqueous solution. Even more preferably, the solvent consists of water. While there are no specific restrictions concerning the concentrations of the solutions, preferably the aqueous solutions, acid concentrations are preferred in the range of from 1 to 50 weight-%, preferably from 2 to 40 weight-%, more preferably from 3 to 30 weight-%, more preferably from 4 to 20 weight-%, more preferably from 5 to 15 weight-%. Preferably, the acid as added under stirring. It is conceivable to first add a suitable amount of water and add concentrated acid thereafter.

Therefore, the present invention relates to the process as described above, wherein in (i), the acid is an inorganic acid, preferably an aqueous solution containing the inorganic acid, more preferably an aqueous solution containing nitric acid as the inorganic acid.

According to the present invention, the method of adjusting the pH of the mother liquor can include the stirring of the mother liquor to which the acid has been added. During this stirring, no further acid is added. Preferably, during this stirring, no compound is added to the mixture. Therefore, the present invention also relates to the process as described above, wherein said method additionally comprises (ii) stirring the mother liquor to which the acid was added according to (i), wherein during (ii), no acid is added to the mother liquor.

While there no specific restrictions concerning the temperature of the mother liquor during (ii), it is preferred that in (ii), the stirring is carried out at a temperature in the range of from 10 to 70° C., more preferably from 20 to 70° C., more preferably from 30 to 65° C., more preferably from 40 to 60° C. Conceivable preferred ranges are from 40 to 50° C. or from 45 to 55° C. or from 50 to 60° C.

According to the present invention, it was found that the specific pH adjustment of the mother liquor containing the BMWW precursor has a significant influence on the size distribution of the particles contained in the mother liquor. In particular, it was found that the particle size, due to the pH adjustment, increases. Without wanting to be bound to any theory, it is believed that due to the pH adjustment, the as-synthesized BMWW precursor primary crystallites contained in the mother liquor may tend to agglomerate, which agglomeration may result in the observed in increase in particle size. Specifically, it was found that in (b), the size of the particles contained in the mother liquor containing the BMWW precursor, expressed by the respective Dv10, Dv50, and Dv90 value, is increased for at least 2%, preferably at least 3%, more preferably at least 4.5% regarding Dv10, for at least 2%, preferably at least 3%, more preferably at least 4.5% regarding Dv50, and for at least 5%, preferably at least 6%, more preferably at least 7% regarding Dv90.

The increase in Dv10 can be up to 5% or up to 6% or up to 7% or up to 9% or up to 10%. The increase in Dv50 can be up to 5% or up to 6% or up to 7%. or up to 9% or up to 10%. The increase in Dv90 can be up to 8% or up to 10% or up to 12% or up to 14% or up to 16% or up to 18%.

The term "Dv10 value" as referred to in the context of the present invention describes the average particle size where 10 volume-% of the particles of have a smaller size. Similarly, the term "Dv50 value" as referred to in the context of the present invention describes the average particle size where 50 volume-% of the particles have a smaller size, and the term "Dv90 value" as referred to in the context of the present invention describes the average particle size where 90 volume-% of the particles have a smaller size. In particular, the Dv10, Dv50, and Dv90 values as referred to in the context of the particles of the mother liquor are to be understood as being determined using the apparatus and the respective parameters as specifically described hereinafter in Reference Example 2.

The solids content of the pH-adjusted mother liquor obtained from (b) largely depends on the solids content of the mother liquor containing the BMWW precursor obtained in (a), and the amount and the concentration of the compound added in (b). Preferably, the pH-adjusted mother liquor obtained from (b) has a solids content in the range of from 1 to 10 weight-%, preferably from 4 to 9 weight-%, more preferably from 7 to 8 weight-%, based on the total weight of the pH-adjusted mother liquor obtained from (b). Further, in order to obtain this solids content, it may be conceivable to suitably dilute or concentrate the mother liquor obtained in (a) prior to adjusting the pH in (b).

Generally, it may conceivable to add at least one organic flocculant to the mother liquor, either prior to, during, or after step (b). Preferably according to the process of the present invention, no organic flocculant is added to the mother liquor, in particular neither prior to (b), nor during (b), nor after (b).

Step (c)

According to step (c), the BMWW precursor is separated from the pH-adjusted mother liquor obtained in (b) by filtration in a filtration device.

Surprisingly, it was found that the pH-adjusted mother liquor obtained in (b), compared to a mother liquor whose pH is not adjusted, exhibits significantly better filtration characteristics. These filtration characteristics are perfectly illustrated by the parameter of the filtration resistance, as determined according the method as described in Reference Example 3 hereinafter. Generally, it has to be understood that the higher the filtration resistance of a given mother liquor containing the BMWW, the longer the filtration time of said mother liquor. According to the present invention, it was found that the filtration resistance of a pH adjusted mother liquor containing a BMWW precursor is preferably at most 50%, more preferably at most 40%, more preferably at most 30% of the respective filtration resistance of a mother liquor whose pH is not adjusted. Therefore, the process of the present invention allows to considerably reduce the filtration resistance of a given mother liquor containing an as-synthesized BMWW precursor and the MWW template compound used for the hydrothermal synthesis of the BMWW precursor. Consequently, the process of the present invention considerably improves the known process, in particular for the large-scale processes for the preparation of a BMWW.

Preferably, the pH-adjusted mother liquor obtained from (b) has a filtration resistance in the range of from 5 to 100 $mPa*s/m^2$, more preferably from 10 to 100 $mPa*s/m^2$, more preferably from 10 to 50 $mPa*s/m^2$, more preferably from 15 to 45 $mPa*s/m^2$, more preferably from 20 to 40 $mPa*s/m^2$.

Therefore, as indicated hereinabove, the present invention also relates to an aqueous suspension, containing as-synthesized BMWW precursor primary crystallites and the MWW template compound used for the synthesis of the BMWW primary crystallites, said suspension having a filtration resistance in the range of from 10 to 100 $mPa*s/m^2$, the aqueous suspension preferably having a pH in the range of from 6 to 9, more preferably from 6.5 to 8.5, more preferably from 7 to 8.

Therefore, as indicated hereinabove, the present invention also relates to an aqueous suspension, containing as-synthesized BMWW precursor primary crystallites and the MWW template compound used for the synthesis of the BMWW primary crystallites, said suspension having a filtration resistance in the range of from 10 to 50 $mPa*s/m^2$, preferably from 15 to 45 $mPa*s/m^2$, more preferably from 20 to 40 $mPa*s/m^2$, the aqueous suspension preferably having a pH in the range of from 6 to 9, more preferably from 6.5 to 8.5, more preferably from 7 to 8.

Preferred filtration devices which can be used in step (c) include filters from which a filter cake is obtained which, in a preferred subsequent step (d), can be subjected to washing. Preferred filter devices include, but are not limited to, closed filter devices such as pressure leaf filters like vertical pressure leaf filters or horizontal pressure lead filters, centrifugal filters such as tubular centrifugal filters, plate-type filters such as horizontal plate closed filters, or suction filters, candle filters, and the like. Especially preferred are closed filter devices.

If so desired, the mother liquor from which the BMWW precursor has been separated can be recycled to the hydrothermal synthesis in step (a), optionally after one or more steps wherein the mother liquor is further worked-up.

Step (d)

Preferably, the BMWW precursor separated by filtration according to step (c), more preferably the filter cake obtained from step (c), is subjected to washing in a step (d) of the present invention.

No specific restrictions exist as far as the washing agent used in step (d) is concerned. Preferably, the washing agent comprises water. More preferably, the washing is water, most preferably deionized water. Therefore, the present invention also relates to the process as described above, which further comprises (d) washing the BMWW precursor obtained from (c), preferably the filter cake obtained from (c), wherein the washing is preferably performed using water as washing agent.

Surprisingly, it was found that the BMWW precursor separated in (c), preferably the filter cake containing the BMWW precursor obtained from (c), compared to a BMWW precursor, preferably a filter cake containing the BMWW, obtained according to a process which, under otherwise identical preparation conditions, does not comprise the inventive pH adjustment of the respective mother liquor, exhibits significantly better washing characteristics. These washing characteristics are perfectly illustrated by the parameter of the washing resistance, as determined according the method as described in Reference Example 3 hereinafter. Generally, it has to be understood that the higher the washing resistance of a given separated BMWW precursor, preferably a given filter cake containing the BMWW precursor, the longer the washing time of said mother liquor. According to the present invention, it was found that the washing resistance of a separated BMWW precursor, preferably a given filter cake containing the BMWW precursor, is preferably at most 10%, more preferably at most 5%, more preferably at most 3% of the respective washing resistance of a separated BMWW precursor, preferably a filter cake containing the BMWW precursor, obtained according to a process which, under otherwise identical preparation conditions, does not comprise the inventive pH adjustment of the respective mother liquor. Therefore, the process of the present invention allows to considerably reduce the washing resistance of a given separated BMWW precursor, preferably a filter cake containing the BMWW precursor, containing the MWW template compound used for the hydrothermal synthesis of the BMWW precursor. Consequently, the process of the present invention considerably improves the known process, in particular for the large-scale processes for the preparation of a BMWW.

Preferably, the separated BMWW precursor, preferably the filter cake containing the BMWW precursor, obtained from (c) has a washing resistance in the range of from 5 to 200 mPa*s/m$^2$, preferably from 5 to 150 mPa*s/m$^2$, more preferably from 5 to 100 mPa*s/m$^2$, more preferably from 10 to 50 mPa*s/m$^2$, more preferably from 15 to 45 mPa*s/m$^2$, more preferably from 20 to 40 mPa*s/m$^2$.

Therefore, as indicated hereinabove, the present invention also relates to a filter cake, containing as-synthesized BMWW precursor primary crystallites and the MWW template compound used for the synthesis of the BMWW primary crystallites, said filter cake having a washing resistance in the range of from 5 to 200 mPa*s/m$^2$, preferably from 5 to 150 mPa*s/m$^2$, more preferably from 10 to 50 mPa*s/m$^2$, more preferably from 15 to 45 mPa*s/m$^2$, more preferably from 20 to 40 mPa*s/m$^2$.

The separated BMWW precursor, preferably the filter cake containing the BMWW precursor, obtained from (c) may have a washing resistance in the range of from 20 to 500 mPa*s/m$^2$, preferably from 50 to 450 mPa*s/m$^2$, more preferably from 100 to 400 mPa*s/m$^2$ In particular in case deionized water is employed as washing agent in (d), the washing is carried out until the conductivity of the filtrate is at most 300 microSiemens/cm, preferably at most 250 microSiemens/cm, more preferably at most 200 microSiemens/cm.

Step (e)

The separated and preferably washed BMWW precursor, preferably the preferably washed filter cake containing the BMWW precursor, is optionally dried in a further step (e).

Preferred drying temperatures are in the range of from 10 to 200° C., preferably from 10 to 75° C., more preferably from 15 to 60° C., more preferably from 20 to 50° C., more preferably from 20 to 40° C., more preferably from 20 to 30° C.

Drying in step (e) can be accomplished by any conceivable means, such as in a continuously operated oven, a static oven, or by subjecting the separated and preferably washed BMWW precursor, preferably the preferably washed filter cake containing the BMWW precursor, to a gas stream having the above described temperatures. A combination of two or more of these methods can be applied. Preferably, the separated and preferably washed BMWW precursor, preferably the preferably washed filter cake containing the BMWW precursor, is subjected to a gas stream. Preferably, the gas is oxygen, nitrogen such as technical nitrogen, a noble gas such as argon, air, lean air, or a mixture of two or more thereof. Preferably, the gas is nitrogen, more preferably technical nitrogen.

Therefore, the present invention also relates to the process as described above, which further comprises (e) drying the BMWW obtained from (c), preferably from (d), at a temperature in the range of from 10 to 200° C., preferably from 20 to 50° C., more preferably from 20 to 40° C., more preferably from 20 to 30° C., wherein the drying is preferably carried out by subjecting the BMWW precursor to a gas stream, preferably a nitrogen stream.

If step (e) is performed, the drying is preferably carried out until the residual moisture of the separated BMWW precursor obtained from (c), preferably from (d), preferably the filter cake containing the BMWW precursor obtained from (c), preferably from (d), is in the range of from 80 to 90 weight-%, preferably from 80 to 85 weight-%.

The material obtained from (c), preferably from (d), which is optionally dried according to step (e) can be further dried, for example at higher temperature. Further, the material obtained from (c), preferably from (d), which is optionally dried according to step (e) and optionally further dried, can be subjected to calcination to obtain the BMWW from the BMWW precursor. Concerning the calcination conditions, no specific restrictions exist provided that the BMWW is obtained from the BMWW precursor. The calcination is carried out preferably at a temperature in the range of from 500 to 700° C., more preferably from 550 to 675° C., more preferably from 600 to 650° C. Further, the calcination is carried out preferably for a period of time in the range of from 0.1 to 24 h, more preferably from 1 to 24 h, more preferably from 2 to 18 h, more preferably from 4 to 12 h. The calcination can be carried out in any suitably atmosphere such as oxygen, nitrogen such as technical nitrogen, a noble gas such as argon, air, lean air, or a mixture of two or more thereof. Further, the calcination can be carried out in a static calciner or a continuous-type calciner such as a rotary calciner.

Steps (f) and (g)

More preferably, a suspension is prepared from the material obtained from (c), preferably from (d), which is optionally dried according to step (e). Preferably, the liquid in which the material is suspended contains water. More preferably, the liquid is water, preferably deionized water. Especially preferably, this suspension is subsequently subject to rapid drying such as to spray drying or to spray granulation, preferably to spray drying. Regarding the solids content of the suspension thus prepared, no specific restrictions exist provided that the subsequent rapid drying can be carried out. Preferably, the suspension prepared in this step (f) containing the BMWW precursor obtained from to (c), preferably from (d), optionally from (e), has a solids content in the range of from 1 to 40 weight-%, preferably from 5 to 30 weight-%, more preferably from 10 to 20 weight-%, more preferably from 12 to 18 weight-%, more preferably from 14 to 16 weight-%.

Therefore, the present invention relates to the process as described above, which further comprises (f) preparing a suspension, preferably an aqueous suspension, containing the BMWW precursor obtained from to (c), preferably from (d), optionally from (e), and having a solids content in the range of from 10 to 20 weight-%, preferably from 12 to 18 weight-%, more preferably from 14 to 16 weight-%;

(g) spray drying the suspension obtained from (f) containing the BMWW precursor, obtaining a spray powder.

Concerning the preferred spray drying according to step (g) of the process of the present invention, no specific restrictions exist.

Generally, spray-drying is a direct method of drying for example slurries or suspensions by feeding a well-dispersed liquid-solid slurry or suspension a suitable atomizer and subsequently flash-drying in a stream of hot gas. Thereby, the slurry or suspension is continuously passed over nozzles, atomizing discs or other suitable atomizing means (reference is made, for example, to Arthur Lefebvre, "Atomisation and Sprays", Hemisphere Publishing Corporation, 1989, ISBN 0-89116-603-3) and sprayed into a drying chamber which is suitably heated with at least one hot gas. Spray-drying is generally carried out continuously, either without or with (agglomerating mode) returning the solid to the spraying compartment. Spray-drying is disclosed, for example, in K. Masters, "Spray Drying Handbook", Longman Scientific & Technical, 1991, ISBN 0-582-06266-7. The atomizer mentioned above can be of several different types. Most common is wheel atomization which uses high-speed rotation of a wheel or a disc to break up the slurry into droplets that spin out from the wheel into a chamber and are flash-dried prior to hitting the chamber walls. The atomization may also be accomplished by single-component nozzles which rely on hydrostatic pressure to force the slurry through a small nozzle. Multi-component nozzles such as two-component nozzles are also used, where gas pressure is used to force the slurry through the nozzle. The use of a rotating sprayer is also conceivable.

According to the present invention, it is especially preferred to employ a drying gas having a temperature in the range of from 100 to 700° C., preferably in the range of from 100 to 500° C., preferably in the range of from 150 to 450° C., more preferably in the range of from 200 to 400° C., more preferably in the range of from 250 to 350° C. As drying gas, air, lean air or oxygen-nitrogen mixtures with an oxygen content of up to 10 volume-%, preferably of up to 5 volume-%, more preferably of less than 5 volume-%, as, for example, of up to 2 volume-%, may be employed. It is preferred to use inert gases as drying gas. Technical nitrogen is especially preferred as drying gas.

According to the present invention, it is especially preferred to employ a nozzle gas having a temperature in the range of from 10 to 100° C., preferably in the range of from 15 to 75° C., more preferably in the range of from 20 to 50° C., more preferably in the range of from 20 to 30° C. As nozzle gas, air, lean air or oxygen-nitrogen mixtures with an oxygen content of up to 10 volume-%, preferably of up to 5 volume-%, more preferably of less than 5 volume-%, as, for example, of up to 2 volume-%, may be employed. It is preferred to use inert gases as nozzle gas. Technical nitrogen is especially preferred as nozzle gas.

As nozzle, a two-component nozzle is especially preferred. In particular, such a two-component nozzle has a diameter in the range of from 2 to 6 mm, preferably from 3 to 5 mm, more preferably from 3.5 to 4.5 mm, more preferably from 3.9 to 4.1 mm, more preferably of 4 mm.

Further, it is preferred to use a spray tower configured, optionally with a dehumidifier, and with a filter, and a scrubber, preferably in this sequence, through which configuration the drying gas together with the slurry to be sprayed is passed. According to this embodiment, the temperature of the drying gas as described hereinabove is to be understood as the initial temperature of the drying gas which is passed optionally to the dehumidifier, or to the filter.

Therefore, the present invention relates to above-defined process, wherein in (g), a spray-apparatus, preferably a spray-tower is used for spray-drying the suspension, said apparatus having at least one spray-nozzle, preferably at least one two-substance nozzle, more preferably one two-substance nozzle, said nozzle having a diameter in the range of from 3.5 to 4.5 mm, preferably from 3.9 to 4.1 mm.

Further, the present invention relates to said process, wherein in (g), a spray-apparatus, preferably a spray-tower is used for spray-drying the suspension, said apparatus being operated with a nozzle gas having a temperature in the range of from 20 to 50° C., preferably of from 20 to 30° C., and a drying gas having a temperature in the range of from 200 to 400° C., preferably of from 250 to 300° C., said nozzle gas preferably being an inert gas, more preferably technical nitrogen, and said drying gas preferably being an inert gas, more preferably technical nitrogen.

Step (h)

While it is generally possible to use the spray powder preferably obtained from step (g) as such, for example as a precursor for the preparation of a catalyst, of an adsorbent, of an absorbent, of a filler or the like, it is preferred to subject the spray powder to calcination in a step (h).

Concerning the calcination conditions, no specific restrictions exist provided that the BMWW is obtained from the BMWW precursor contained in the spray powder. The calcination is carried out preferably at a temperature in the range of from 500 to 700° C., more preferably from 550 to 675° C., more preferably from 600 to 650° C. Further, the calcination is carried out preferably for a period of time in the range of from 0.1 to 24 h, more preferably from 1 to 24 h, more preferably from 2 to 18 h, more preferably from 4 to 12 h. The calcination can be carried out in any suitably atmosphere such as oxygen, nitrogen such as technical nitrogen, a noble gas such as argon, air, lean air, or a mixture of two or more thereof. Further, the calcination can be carried out in a static calciner or a continuous-type calciner such as a rotary calciner. Preferably, in particular in large-scale processes for the preparation of a BMWW, a continuous-type calciner, more preferable a rotary calciner is employed. Regarding the preferred continous-mode operation conditions, no specific restrictions exist. Preferably, the calcining which is carried out in continuous mode is carried out at a throughput in the range of from 0.5 to 20 kg spray powder per h.

Therefore, the present invention also relates to the process as described above, which further comprises (h) calcining the spray powder obtained from (g) containing the BMWW, preferably at a temperature in the range of from 500 to 700° C., more preferably from 550 to 675° C., more preferably from 600 to 650° C. for a period of time in the range of from 0.1 to 24 h, preferably from 1 to 24 h, more preferably from 2 to 18 h, more preferably from 4 to 12 h, obtaining a spray powder containing the BMWW.

As described hereinabove in detail, the suspension subjected to spray drying is prepared in step (f) from the BMWW precursor obtained from to (c), preferably from (d), optionally from (e). Since the solids contained in the suspension essentially consist of the BMWW precursor and the MWW template compound, and since the MWW template compound is essentially completely removed by the calcination in step (h), the calcined spray powder preferably obtained from (h) essentially consists of the BMWW. In particular, at least 99 weight-%, more preferably at least 99.5 weight-%, more preferably at least 99.9 weight-% of the spray powder consist of the aluminum-free BMWW.

Therefore, the present invention also relates to the process as described above, which further comprises (h) calcining the spray powder obtained from (g) containing the BMWW, preferably at a temperature in the range of from 500 to 700° C., more preferably from 550 to 675° C., more preferably from 600 to 650° C. for a period of time in the range of from 0.1 to 24 h, preferably from 1 to 24 h, more preferably from 2 to 18 h, more preferably from 4 to 12 h, obtaining a spray powder of which at least 99 weight-%, more preferably at least 99.5 weight-% consist of the BMWW.

Preferably, the present invention relates to a process for preparing an aluminum-free boron containing zeolitic material comprising the framework structure MWW (BMWW), comprising (a) hydrothermally synthesizing a BMWW precursor from a synthesis mixture containing water, a silicon source, a boron source, and an MWW template compound obtaining the BMWW precursor in its mother liquor, the mother liquor having a pH above 9;
(b) adjusting the pH of the mother liquor, obtained in (a) and containing the BMWW precursor, to a value in the range of from 6 to 9, wherein in (b), the pH is adjusted by a method comprising
    (i) adding an acid to the mother liquor obtained from (a) containing the BMWW precursor, wherein the adding is preferably carried out at least partially under stirring;
    (ii) optionally stirring the mother liquor to which the acid was added according to (i), wherein during (ii), no acid is added to the mother liquor;
(c) separating the BMWW precursor from the pH-adjusted mother liquor obtained in (b) by filtration in a filtration device;
(d) washing the BMWW precursor obtained from (c), preferably the filter cake obtained from (c), wherein the washing is preferably performed using water as washing agent;
(e) optionally drying the BMWW obtained from (c) at a temperature in the range of from 10 to 200° C., preferably from 20 to 50° C., more preferably from 20 to 40° C., more preferably from 20 to 30° C., wherein the drying is preferably carried out by subjecting the BMWW precursor to a gas stream, preferably a nitrogen stream;
(f) preparing a suspension, preferably an aqueous suspension, containing the BMWW precursor obtained from to (d), optionally from (e), and having a solids content in the range of from 10 to 20 weight-%, preferably from 12 to 18 weight-%, more preferably from 14 to 16 weight-%;
(g) spray drying the suspension obtained from (f) containing the BMWW precursor, obtaining a spray powder;
(h) calcining the spray powder obtained from (g) containing the BMWW, preferably at a temperature in the range of from 500 to 700° C., more preferably from 550 to 675° C., more preferably from 600 to 650° C. for a period of time in the range of from 0.1 to 24 h, preferably from 1 to 24 h, more preferably from 2 to 18 h, more preferably from 4 to 12 h, obtaining a spray powder of which at least 99 weight-%, more preferably at least 99.5 weight-% consist of the BMWW.

Further, the present invention relates to an aluminum-free boron containing zeolitic material comprising the framework structure MWW (BMWW), obtainable or obtained by a process as described hereinabove, in particular by a process comprising (a) hydrothermally synthesizing a BMWW precursor from a synthesis mixture containing water, a silicon source, a boron source, and an MWW template compound obtaining the BMWW precursor in its mother liquor, the mother liquor having a pH above 9;
(b) adjusting the pH of the mother liquor, obtained in (a) and containing the BMWW precursor, to a value in the range of from 6 to 9, wherein in (b), the pH is adjusted by a method comprising
    (i) adding an acid to the mother liquor obtained from (a) containing the BMWW precursor, wherein the adding is preferably carried out at least partially under stirring;
    (ii) optionally stirring the mother liquor to which the acid was added according to (i), wherein during (ii), no acid is added to the mother liquor;
(c) separating the BMWW precursor from the pH-adjusted mother liquor obtained in (b) by filtration in a filtration device;
(d) washing the BMWW precursor obtained from (c), preferably the filter cake obtained from (c), wherein the washing is preferably performed using water as washing agent;
(e) optionally drying the BMWW obtained from (c) at a temperature in the range of from 10 to 200° C., preferably from 20 to 50° C., more preferably from 20 to 40° C., more preferably from 20 to 30° C., wherein the drying is preferably carried out by subjecting the BMWW precursor to a gas stream, preferably a nitrogen stream;
(f) preparing a suspension, preferably an aqueous suspension, containing the BMWW precursor obtained from to (d), optionally from (e), and having a solids content in the range of from 10 to 20 weight-%, preferably from 12 to 18 weight-%, more preferably from 14 to 16 weight-%;
(g) spray drying the suspension obtained from (f) containing the BMWW precursor, obtaining a spray powder;
(h) calcining the spray powder obtained from (g) containing the BMWW, preferably at a temperature in the range of from 500 to 700° C., more preferably from 550 to 675° C., more preferably from 600 to 650° C. for a period of time in the range of from 0.1 to 24 h, preferably from 1 to 24 h, more preferably from 2 to 18 h, more preferably from 4 to 12 h, obtaining a spray powder of which at least 99 weight-%, more preferably at least 99.5 weight-% consist of the BMWW.

The Spray Powder Obtained

Preferably, the degree of crystallinity of the BMWW contained in the spray powder obtained from (h) is at least (75±5) %, preferably at least (80±5) %, as determined via XRD and as described in Reference Example 1 hereinafter.

Preferably, the BET specific surface area of the BMWW contained in the spray powder obtained from (h) is at least 300 m$^2$/g, preferably in the range of from 300 to 500 m$^2$/g, as determined according to DIN 66131.

Preferably, the boron content of the BMWW contained in the spray powder obtained from (h), calculated as elemental boron, is at least 1 weight-%, preferably in the range of from 1.0 to 2.2 weight-%, more preferably from 1.2 to 1.8 weight-%.

Preferably, the silicon content of the BMWW contained in the spray powder obtained from (h), calculated as elemental silicon, is at least 37 weight-%, preferably in the range of from 40 to 50 weight-%, more preferably from 41 to 45 weight-%, based on the total weight of the BMWW.

Preferably, the total organic carbon content of the spray powder obtained from (h) is at most 0.3 weight-%, preferably at most 0.2 weight-%, more preferably at most 0.1 weight-%.

Preferably, the particle size distribution of the spray powder obtained from (h) is characterized by a Dv10 value, in micrometer, of at least 2, preferably in the range of from 2 to 10, a Dv50 value, in micrometer, of at least 5, preferably in the range of from 5 to 20, and a Dv90 value, in micrometer, of at least 15, preferably in the range of from 15 to 30.

Therefore, the present invention also relates to an aluminum-free boron containing zeolitic material comprising the framework structure MWW (BMWW), which is optionally obtainable or obtained by a process as described hereinabove and preferably being contained in a spray powder wherein at least 99 weight-% of the spray powder consist of the BMWW, wherein the BMWW has boron content in the range of from 1.0 to 2.2 weight-%, calculated as elemental boron and based on the total weight of the BMWW, a silicon content of at least 37 weight-%, calculated as elemental silicon and based on the total weight of the BMWW, a degree of crystallinity of at least (80 ±5) %, as determined via XRD, and a BET specific surface area of at least 300 m$^2$/g, preferably in the range of from 300 to 500 m$^2$/g, as determined according to DIN 66131.

Yet further, the present invention relates to aluminum-free boron containing zeolitic material comprising the framework structure MWW (BMWW), which is optionally obtainable or obtained by a process as described hereinabove and preferably being contained in a spray powder wherein at least 99 weight-% of the spray powder consist of the BMWW, wherein the BMWW has boron content in the range of from 1.0 to 2.2 weight-%, calculated as elemental boron and based on the total weight of the BMWW, a silicon content of at least 37 weight-%, calculated as elemental silicon and based on the total weight of the BMWW, a degree of crystallinity of at least (80±5) %, as determined via XRD, and a BET specific surface area of at least 300 m$^2$/g, preferably in the range of from 300 to 500 m$^2$/g, as determined according to DIN 66131, obtainable or obtained by a process comprising (a) hydrothermally synthesizing a BMWW precursor from a synthesis mixture containing water, a silicon source, a boron source, and an MWW template compound obtaining the BMWW precursor in its mother liquor, the mother liquor having a pH above 9;

(b) adjusting the pH of the mother liquor, obtained in (a) and containing the BMWW precursor, to a value in the range of from 6 to 9, wherein in (b), the pH is adjusted by a method comprising
  (i) adding an acid to the mother liquor obtained from (a) containing the BMWW precursor, wherein the adding is preferably carried out at least partially under stirring;
  (ii) optionally stirring the mother liquor to which the acid was added according to (i), wherein during (ii), no acid is added to the mother liquor;

(c) separating the BMWW precursor from the pH-adjusted mother liquor obtained in (b) by filtration in a filtration device;

(d) washing the BMWW precursor obtained from (c), preferably the filter cake obtained from (c), wherein the washing is preferably performed using water as washing agent;

(e) optionally drying the BMWW obtained from (c) at a temperature of in the range of from 10 to 200° C., preferably from 20 to 50° C., more preferably from 20 to 40° C., more preferably from 20 to 30° C., wherein the drying is preferably carried out by subjecting the BMWW precursor to a gas stream, preferably a nitrogen stream;

(f) preparing a suspension, preferably an aqueous suspension, containing the BMWW precursor obtained from to (d), optionally from (e), and having a solids content in the range of from 10 to 20 weight-%, preferably from 12 to 18 weight-%, more preferably from 14 to 16 weight-%;

(g) spray drying the suspension obtained from (f) containing the BMWW precursor, obtaining a spray powder;

(h) calcining the spray powder obtained from (g) containing the BMWW, preferably at a temperature in the range of from 500 to 700° C., more preferably from 550 to 675° C., more preferably from 600 to 650° C. for a period of time in the range of from 0.1 to 24 h, preferably from 1 to 24 h, more preferably from 2 to 18 h, more preferably from 4 to 12 h, obtaining a spray powder of which at least 99 weight-%, more preferably at least 99.5 weight-% consist of the BMWW;

wherein the total organic carbon content of the spray powder obtained from (h) is at most 0.3 weight-%, preferably at most 0.2 weight-%, more preferably at most 0.1 weight-% and the particle size distribution of the spray powder obtained from (h) is characterized by a Dv10 value, in micrometer, of at least 2, preferably in the range of from 2 to 10, a Dv50 value, in micrometer, of at least 5, preferably in the range of from 5 to 20, and a Dv90 value, in micrometer, of at least 15, preferably in the range of from 15 to 30.

Uses

The BMWW according to the present invention and the BMWW obtainable or obtained by the process according to the present invention can be used for every conceivable purpose, for example as a catalyst, as a catalyst support, as an adsorbent, as an absorbent, as a filler, as a molecular sieve, or as a precursor for the preparation thereof.

More preferably, it is used as a catalyst precursor for the preparation of a titanium containing zeolitic catalyst, preferably a titanium containing zeolitic catalyst having zeolite frame work structure MWW (TiMWW), more preferably a zinc and titanium containing zeolitic catalyst having zeolite frame work structure MWW (ZnTiMWW). According to the most preferred uses, the BMWW is preferably subjected to deboronation to obtain a deboronated BMWW (MWW), wherein the MWW is subjecting to hydrothermal synthesis conditions in the presence of a titanium source to obtain a TiMWW, the TiMWW is preferably subjected to an acid treatment to obtain a TiMWW. Optionally, this TiMWW is then subjected to a molding process according to which the TiMWW is preferably shaped together with a suitable binder, preferably a silica binder. Optionally, the thus obtained molding is suitably post-treated such as water-treated. Preferably, the TiMWW or the shaped TiMWW, optionally further containing at least one noble metal, is used as an oxidation agent, preferably as an epoxidation agent, in particular for epoxidizing an organic compound containing at least one carbon-carbon double bond.

It is further preferred to subject the TiMWW to a treatment with a zinc containing compound to obtain the ZnTiMWW. Optionally, this ZnTiMWW is then subjected to a molding process according to which the ZnTiMWW is preferably shaped together with a suitable binder, preferably a silica binder. Optionally, the thus obtained molding is suitably post-treated such as water-treated. Preferably, the ZnTiMWW or the shaped ZnTiMWW is used as an oxidation agent, preferably as an epoxidation agent, in particular for epoxidizing an organic compound containing at least one carbon-carbon double bond.

Further, the present invention also relates to a process for the preparation of a catalyst wherein the BMWW of the present invention or the BMWW obtainable or obtained by the process according to the present invention is used as a precursor, the catalyst preferably being a TiMWW catalyst, said process preferably comprising subjecting the BMWW to deboronation to obtain a deboronated BMWW (MWW), subjecting the MWW to hydrothermal synthesis conditions in the presence of a titanium source to obtain a TiMWW, preferably subjected the TiMWW to an acid treatment to obtain a TiMWW, optionally subjecting the TiMWW to a molding process wherein the TiMWW is preferably shaped together with a suitable binder, preferably a silica binder, and optionally suitably post-treating such as water-treating the shaped TiMWW.

Further, the present invention also relates to a process for the preparation of a catalyst wherein the BMWW of the present invention or the BMWW obtainable or obtained by the process according to the present invention is used as a precursor, the catalyst preferably being a ZnTiMWW catalyst, said process preferably comprising subjecting the BMWW to deboronation to obtain a deboronated BMWW (MWW), subjecting the MWW to hydrothermal synthesis conditions in the presence of a titanium source to obtain a TiMWW, preferably subjected the TiMWW to an acid treatment to obtain a TiMWW, subjecting the TiMWW to a treatment with a zinc containing compound to obtain the ZnTiMWW, optionally subjecting the ZnTiMWW to a molding process wherein the ZnTiMWW is preferably shaped together with a suitable binder, preferably a silica binder, and optionally suitably post-treating such as water-treating the obtained molding.

The present invention is further characterized by the following preferred embodiments including the combinations of embodiments indicated by the respective dependencies:

1. A process for preparing an aluminum-free boron containing zeolitic material comprising the framework structure MWW (BMWW), comprising
   (a) hydrothermally synthesizing a BMWW precursor from a synthesis mixture containing water, a silicon source, a boron source, and an MWW template compound obtaining the BMWW precursor in its mother liquor, the mother liquor having a pH above 9;
   (b) adjusting the pH of the mother liquor, obtained in (a) and containing the BMWW precursor, to a value in the range of from 6 to 9;
   (c) separating the BMWW precursor from the pH-adjusted mother liquor obtained in (b) by filtration in a filtration device.
2. The process of embodiment 1, wherein in (a), at least 95 weight-%, preferably at least 99 weight-%, more preferably at least 99.9 weight-% of the synthesis mixture consist of the water, the silicon source, the boron source, and the template compound.
3. The process of embodiment 1 or 2, wherein in (a), the silicon source is selected from the group consisting of fumed silica, colloidal silica, and a mixture thereof, the silicon source preferably being colloidal silica, more preferably ammonia-stabilized silica, the boron source is selected from the group consisting of boric acid, borates, boron oxide, and a mixture of two or more thereof, the boron source preferably being boric acid, and the MWW template compound selected from the group consisting of piperidine, hexamethylene imine, N,N,N,N',N',N'-hexamethyl-1,5-pentanediammonium ion, 1,4-bis(N-methylpyrrolidinium) butane, octyltrimethylammonium hydroxide, heptyltrimethylammonium hydroxide, hexyltrimethylammonium hydroxide, N,N,N-trimethyl-1-adamantylammonium hydroxide, and a mixture of two or more thereof, the MWW template compound preferably being piperidine.
4. The process of any of embodiments 1 to 3, wherein in (a), the synthesis mixture contains the boron source, calculated as elemental boron, relative to the silicon source, calculated as elemental silicon, in a molar ratio in the range of from 0.4:1 to 2.0:1, preferably from 0.6:1 to 1.9:1, more preferably from 0.9:1 to 1.4:1, the water relative to the silicon source, calculated as elemental silicon, in a molar ratio in the range of from 1:1 to 30:1, preferably from 3:1 to 25:1, more preferably from 6:1 to 20:1; and the MWW template compound relative to the silicon source, calculated as elemental silicon, in a molar ratio in the range of from 0.4:1 to 2.0:1, preferably from 0.6:1 to 1.9:1, more preferably from 0.9:1 to 1.4:1.
5. The process of any of embodiments 1 to 4, wherein in (a), the hydrothermal synthesizing is carried out at a temperature in the range of from 160 to less than 180° C., preferably from 170 to 177° C., for a period of time in the range of from 1 to 72 h, preferably from 6 to 60 h, more preferably from 12 to 50 h.
6. The process of any of embodiments 1 to 5, wherein in (a), the hydrothermal synthesizing is carried out at least partially under stirring.
7. The process of any of embodiments 1 to 6, wherein in (a), the synthesis mixture additionally contains a seeding material, preferably a zeolitic material comprising the framework structure MWW, more preferably a boron containing zeolitic material comprising the framework structure MWW.
8. The process of embodiment 7, wherein the synthesis mixture contains the seeding material, relative to the silicon source, in a weight ratio in the range of from 0.01:1 to 1:1, preferably from 0.02:1 to 0.5:1, more preferably from 0.03:1 to 0.1:1, calculated as amount of seeding material in kg relative to silicon contained in the silicon source calculated as silicon dioxide in kg.

9. The process of any of embodiments 1 to 8, wherein the pH of the mother liquor obtained from (a) is above 10, preferably in the range of from 10.5 to 12, more preferably from 11 to 11.5.
10. The process of any of embodiments 1 to 9, wherein in (b), the pH of the mother liquor obtained in (a) is adjusted to a value in the range of from 6.5 to 8.5, preferably from 7 to 8.
11. The process of any of embodiments 1 to 10, wherein in (b), the pH is adjusted by a method comprising
    (i) adding an acid to the mother liquor obtained from (a) containing the BMWW precursor, wherein the adding is preferably carried out at least partially under stirring.
12. The process of embodiment 11, wherein in (i), the adding is carried out at a temperature of the mother liquor in the range of from 10 to 70° C., preferably from 20 to 70° C., more preferably from 30 to 65° C., more preferably from 40 to 60° C.
13. The process of embodiment 11 or 12, wherein in (i), the acid is an inorganic acid, preferably an aqueous solution containing the inorganic acid.
14. The process of embodiment 13, wherein the inorganic acid is selected from the group consisting of phosphoric acid, sulphuric acid, hydrochloric acid, nitric acid, and a mixture of two or more thereof, the inorganic acid preferably being nitric acid.
15. The process of any of embodiments 12 to 14, the method additionally comprising
    (ii) stirring the mother liquor to which the acid was added according to (i), wherein during (ii), no acid is added to the mother liquor.
16. The process of embodiment 15, wherein in (ii), the stirring is carried out at a temperature in the range of from 10 to 70° C., preferably from 20 to 70° C., more preferably from 25 to 65° C., more preferably from 30 to 60° C.
17. The process of any of embodiments 1 to 16, wherein in (b), the size of the particles contained in the mother liquor, expressed by the respective Dv10, Dv50, and Dv90 value, is increased is increased for at least 2%, preferably at least 3%, more preferably at least 4.5% regarding Dv10, for at least 2%, preferably at least 3%, more preferably at least 4.5% regarding Dv50, and for at least 5%, preferably at least 6%, more preferably at least 7% regarding Dv90.
18. The process of any of embodiments 1 to 17, wherein the pH-adjusted mother liquor obtained from (b) has a solids content in the range of from 1 to 10 weight-%, preferably from 4 to 9 weight-%, more preferably from 7 to 8 weight-%, based on the total weight of the pH-adjusted mother liquor obtained from (b).
19. The process of any of embodiments 1 to 18, wherein the pH-adjusted mother liquor obtained from (b) has a filtration resistance in the range of from 10 to 100 mPa*s/m$^2$, preferably from 10 to 50 mPa*s/m$^2$, preferably from 15 to 45 mPa*s/m$^2$, more preferably from 20 to 40 mPa*s/m$^2$.
20. The process of any of embodiments 1 to 19, further comprising
    (d) washing the BMWW precursor obtained from (c), preferably the filter cake obtained from (c), wherein the washing is preferably performed using water as washing agent.
21. The process of embodiment 20, wherein in (d), the filter cake obtained from (c) is has a washing resistance in the range of from 5 to 200 mPa*s/m$^2$, preferably from 5 to 150 mPa*s/m$^2$, more preferably from 10 to 50 mPa*s/m$^2$, more preferably from 15 to 45 mPa*s/m$^2$, more preferably from 20 to 40 mPa*s/m$^2$.
22. The process of embodiment 20 or 21, wherein the washing is carried out until the conductivity of the filtrate is at most 300 microSiemens/cm, preferably at most 250 microSiemens/cm, more preferably at most 200 microSiemens/cm.
23. The process of any of embodiments 1 to 22, further comprising
    (e) drying the BMWW obtained from (c), preferably from (d), at a temperature in the range of from 10 to 200° C., preferably from 20 to 50° C., more preferably from 20 to 40° C., more preferably from 20 to 30° C., wherein the drying is preferably carried out by subjecting the BMWW precursor to a gas stream, preferably a nitrogen stream.
24. The process of any of embodiments 1 to 23, wherein the residual moisture of the BMWW precursor obtained from (c), preferably from (d), more preferably from (e), is in the range of from 80 to 90 weight-%, preferably from 80 to 85 weight-%.
25. The process of any of embodiments 1 to 24, further comprising
    (f) preparing a suspension, preferably an aqueous suspension, containing the BMWW precursor obtained from to (c), preferably from (d), optionally from (e), and having a solids content in the range of from 10 to 20 weight-%, preferably from 12 to 18 weight-%, more preferably from 14 to 16 weight-%;
    (g) spray drying the suspension obtained from (f) containing the BMWW precursor, obtaining a spray powder;
    (h) calcining the spray powder obtained from (g) containing the BMWW, preferably at a temperature in the range of from 500 to 700° C., more preferably from 550 to 675° C., more preferably from 600 to 650° C. for a period of time in the range of from 0.1 to 24 h, preferably from 1 to 24 h, more preferably from 2 to 18 h, more preferably from 4 to 12 h, obtaining a spray powder of which at least 99 weight-%, more preferably at least 99.5 weight-% consist of the BMWW.
26. The process of embodiment 25, wherein in (h), the calcining is carried out in continuous mode, preferably in a rotary calciner, preferably at a throughput in the range of from 0.5 to 20 kg spray powder per h.
27. The process of embodiment 25 or 26, wherein the degree of crystallinity of the BMWW contained in the spray powder obtained from (h) is at least (75±5) %, preferably at least (80±5) %, as determined via XRD.
28. The process of any of embodiments 25 to 27, wherein the BET specific surface area of the BMWW contained in the spray powder obtained from (h) is at least 300 m$^2$/g, preferably in the range of from 300 to 500 m$^2$/g, as determined according to DIN 66131.
29. The process of any of embodiments 25 to 28, wherein the boron content of the BMWW contained in the spray powder obtained from (h), calculated as elemental boron, is at least 1 weight-%, preferably in the range of from 1.0 to 2.2 weight-%, more preferably from 1.2 to 1.8 weight-%, and the silicon content of the BMWW, calculated as elemental silicon, is at least 37 weight-%, preferably in the range of from 40 to 50 weight-%, more preferably from 41 to 45 weight-%, based on the total weight of the BMWW.

30. An aluminum-free boron containing zeolitic material comprising the framework structure MWW (BMWW), optionally obtainable or obtained by a process according to any of embodiments 1 to 29 and preferably being contained in a spray powder wherein at least 99 weight-% of the spray powder consist of the BMWW, wherein the BMWW has boron content in the range of from 1.0 to 2.2 weight-%, calculated as elemental boron and based on the total weight of the BMWW, a silicon content of at least 37 weight-%, calculated as elemental silicon and based on the total weight of the BMWW, a degree of crystallinity of at least (80±5) %, as determined via XRD, and a BET specific surface area of at least 300 m$^2$/g, as determined according to DIN 66131.

31. The BMWW of embodiment 30, wherein the BET specific surface area is in the range of from 300 to 500 m$^2$/g, as determined according to DIN 66131.

32. Use of an aluminum-free boron containing zeolitic material comprising the framework structure MWW (BMWW) according to embodiment 31 or 32 as a catalyst, as a catalyst support, or as a catalyst precursor, preferably as a catalyst precursor for the preparation of a titanium containing zeolitic catalyst, preferably a zinc and titanium containing zeolitic catalyst.

33. An aqueous suspension, containing as-synthesized BMWW precursor primary crystallites and the MWW template compound used for the synthesis of the BMWW primary crystallites, said suspension having a filtration resistance in the range of from 10 to 100 mPa*s/m$^2$, preferably from 10 to 50 mPa*s/m$^2$, more preferably from 15 to 45 mPa*s/m$^2$, more preferably from 20 to 40 mPa*s/m$^2$.

34. The aqueous suspension of embodiment 33, having a pH in the range of from 6 to 9, preferably from 6.5 to 8.5, more preferably from 7 to 8.

35. A filter cake, containing as-synthesized BMWW precursor primary crystallites and the MWW template compound used for the synthesis of the BMWW primary crystallites, said filter cake having a washing resistance in the range of from 5 to 200 mPa*s/m$^2$, preferably from 5 to 150 mPa*s/m$^2$, more preferably from 10 to 50 mPa*s/m$^2$, more preferably from 15 to 45 mPa*s/m$^2$, more preferably from 20 to 40 mPa*s/m$^2$.

The present invention is further illustrated by the following reference examples, examples, and comparative examples.

REFERENCE EXAMPLE 1

Determination of Crystallinity via XRD

The particle size and the crystallinity of the zeolitic materials according to the present invention were determined by XRD analysis. The data were collected using a standard Bragg-Brentano diffractometer with a Cu-X-ray source and an energy dispersive point detector. The angular range of 2° to 70° (2 theta) was scanned with a step size of 0.02°, while the variable divergence slit was set to a constant illuminated sample length of 20 mm. The data were then analyzed using TOPAS V4 software, wherein the sharp diffraction peaks were modeled using a Pawley fit containing a unit cell with the following starting parameters: a=14.4 Angstrom and c=25.2 Angstrom in the space group P6/mmm. These were refined to fit the data. Independent peaks were inserted at the following positions. 8.4°, 22.4°, 28.2° and 43°. These were used to describe the amorphous content. The crystalline content describes the intensity of the crystalline signal to the total scattered intensity. Included in the model were also a linear background, Lorentz and polarization corrections, lattice parameters, space group and crystallite size.

REFERENCE EXAMPLE 2

Determination of Dv10, Dv50, and Dv90 Values of the Mother Liquors

Either 11.5 g of the suspension (mother liquor, not pH adjusted) were suspended in 100 ml deionized water and stirred, and 6 ml of the resulting suspension were admixed with 830 ml deionized water; or 20.4 g of the suspension (mother liquor, pH adjusted) were suspended in 100 ml deionized water and stirred, and 8 ml of the resulting suspension were admixed with 830 ml deionized water. These suspensions were subjected to measurement in the following apparatus with the following parameters.

Mastersizer 2000 version 5.12G (supplier: Malvern Instruments Ltd., Malvern, UK)
measurement range: 0.020 to 2000 micrometer
dispersion module: Hydro 2000G (A)
analysis model: universal
emulation: off

REFERENCE EXAMPLE 3

Determination of the Filtration Resistance of a Suspension and of the Washing Resistance of a Filter Cake The filtration resistance R(F) of a given suspension was determined according to the formula:

$$R(F)=[2*t(\text{end})*A*\text{delta }p]/[V(F,\text{end})*H(\text{end})]$$

wherein
t(end)=endpoint of filtration (in s) (defined as time after start of filtration when the fluid level in the filtration device has the same height as the filter cake)
A=filter area (in m$^2$)
delta p=filtration pressure (in Pa) (pressure difference over the filter cake)
V(F,end)=volume of the filtrate at t(end) (in m$^3$)
H(end)=filter cake height at t(end) (in m)

The washing resistance R(W) of a given filter cake was determined according to the formula:

$$R(W)=[t(\text{end})*A*\text{delta }p]/[V(F,\text{end})*H(\text{end})]$$

wherein
t(end)=endpoint of washing (in s) (time after start of washing when the fluid level of the washing agent in the filtration device has the same height as the filter cake)
A=filter area (in m$^2$)
delta p=filtration pressure (in Pa) (pressure difference over the filter cake)
V(F,end)=volume of the filtrate at t(end) (in m$^3$)
H(end)=filter cake height at t(end) (in m)

REFERENCE EXAMPLE 2

Determination of Dv10, Dv50, and Dv90 Values of the Spray-Dried and Calcined BMWW 1.0 g of the material to be assessed is suspended in 100 g deionized water and stirred for 1 min. The resulting suspension is subjected to measurement in the following apparatus with the following parameters.

Mastersizer S long bed version 2.15, ser. No. 33544-325; supplier: Malvern Instruments GmbH, Herrenberg, Germany
focal width: 300RF mm
beam length: 10.00 mm
module: MS17
shadowing: 16.9%
dispersion model: 3$$D
analysis model: polydisperse
correction: none

EXAMPLE 1

Preparation of Boron-Containing MWW (BMWW) with pH Adjustment a) Hydrothermal Synthesis
15.78 kg de-ionized water were provided in a vessel. Under stirring at 100 rpm (rounds per minute), 9.08 kg piperidine were added and 5.41 kg boric acid were suspended. To the resulting solution, 13.07 kg Ludox® AS-40 were added, and the resulting mixture was stirred at 100 rpm for 1 h.
In this synthesis mixture, the boron source boric acid, calculated as elemental boron, relative to the silicon source Ludox® AS-40, calculated as elemental silicon, was present in a molar ratio of 1:1; the water relative to the silicon source Ludox® AS-40, calculated as elemental silicon, was present in a molar ratio of 10:1; and the template compound piperidine relative to the silicon source Ludox® AS-40, calculated as elemental silicon, was present in a molar ratio of 1.2:1.
The finally obtained mixture was transferred to a crystallization vessel and heated to 170° C. within 4 h under autogenous pressure and under stirring (100 rpm). The temperature of 170° C. was kept essentially constant for 120 h; during these 120 h, the mixture was stirred at 100 rpm. Subsequently, the mixture was cooled to a temperature of 40° C. within 2 h.
b) pH Adjustment
To 5 l of the suspension obtained in a), 5 l of a 10 weight-% $HNO_3$ aqueous solution were added within 10 min under stirring at 100 r.p.m. (rounds per minute). The adding was carried out at a temperature of the suspension of 40° C.
The pH of the thus pH-adjusted mother liquor as determined via measurement with a pH electrode was 7.
Separation
From the pH-adjusted mother liquor obtained in b), the B-MWW precursor was separated by filtration using a suction filter. The filter material was Sefar Tetex® Mono 24-1100-SK 012.
The filtration resistance of the pH-adjusted mother liquor obtained in b) was $30*10^{12}$ mPa*s/m$^2$ as determined as described in Reference Example 3 hereinabove.
The filter cake was then washed with de-ionized water until the washing water had a conductivity of less than 300 microSiemens/cm.
The washing resistance of the filter cake was $30*10^{12}$ mPa*s/m$^2$ as determined as described in Reference Example 3 hereinabove.
d) Calcination
The filter cake obtained by the separation described above was dried in a static oven at 120° C. for 10 h.

The dried material was then subjected to calcination at 650° C. in a static oven for 5 h.
The obtained zeolitic material BMWW had a boron content of 1.6 weight-%, a silicon content of 39 weight-%, a total organic carbon (TOC) content of <0.1 weight-% and a crystallinity of 79%, determined by XRD according according to Reference Example 1.

COMPARATIVE EXAMPLE 1

Preparation of Boron-Containing MWW (BMWW) without pH Adjustment

The BMWW was prepared according to the first process step as described in Example 1 of WO 03/074422 A1. Thus, the BMWW according to Comparative Example 1 of the present invention was prepared according to Example 1 of the present invention except that the pH of the mother liquor obtained in a) was not adjusted, i.e. no step b) was carried out.
The filtration resistance of the mother liquor obtained, i.e. of the mother liquor which was not pH-adjusted, was $100*10^{12}$ mPa*s/m$^2$ as determined as described in Reference Example 3 hereinabove.
The filter cake was then washed with de-ionized water until the washing water had a conductivity of less than 300 microSiemens/cm.
The washing resistance of the filter cake was $2500*10^{12}$ mPa*s/m$^2$ as determined as described in Reference Example 3 hereinabove.
Calcination was carried out as described in Example 1.

EXAMPLE 2

Preparation of Boron-Containing MWW (BMWW) with Seeding and with pH Adjustment

The preparation of the BMWW was carried out as described in Example 1, except that to the hydrothermal synthesis mixture, a seeding material was added.
As seeding material, a boron containing zeolitic material of structure type MWW was used, essentially prepared according the the recipe as described in Example 1, having a boron content of 1.9 weight-%, a silicon content of 41 weight-%, a total organic carbon (TOC) content of <0.1 wt.% and a crystallinity of 74%, as determined by XRD. The BET specific surface area determined via nitrogen adsorption at 77 K according to DIN 66131 was 448 m$^2$/g, the pore volume determined according to Hg porosimetry according to DIN 66133 was 5.9 mL/g. The particle size distribution of the seeding material was characterized by Dv10 of 6.5 micrometer, Dv50 of 26.9 micrometer, and Dv90 of 82.2 micrometer, determined as described in Reference Example 4.
In the synthesis mixture, seeding material, relative to the silicon source Ludox® AS-40, calculated as elemental silicon, was present in a weight ratio of 0.1:1.
The hydrothermal synthesis was carried as described in Example 1 under otherwise identical synthesis conditions, the crystallization time could be reduced to 24 h.
The mother liquor containing the crystallized BMWW precursor had a pH of 11.3 as determined via measurement with a pH electrode. The pH adjustment was carried out as described in Example 1.
The filtration resistance of the pH adjusted mother liquor was $100*10^{12}$ mPa*s/m$^2$ as determined as described in Reference Example 3 hereinabove.

The filter cake was then washed with de-ionized water until the washing water had a conductivity of less than 300 microSiemens/cm.

The washing resistance of the filter cake was $90*10^{12}$ mPa*s/m$^2$ as determined as described in Reference Example 3 hereinabove.

Calcination was carried out as described in Example 1.

The obtained zeolitic material BMWW had a boron content of 1.3 weight-%, a silicon content of 38 weight-%, a total organic carbon (TOC) content of <0.1 weight-% and a crystallinity of 80%, determined by XRD according according to Reference Example 1. The BET specific surface area determined via nitrogen adsorption at 77 K according to DIN 66131 was 412 m$^2$/g.

COMPARATIVE EXAMPLE 2

Preparation of Boron-Containing MWW (BMWW) with Seeding and without pH Adjustment The BMWW was prepared according to the first process step as described in Example 1 of WO 03/074422 A1. Thus, the BMWW according to Comparative Example 2 of the present invention was prepared according to Example 2 of the present invention except that the pH of the mother liquor obtained in a) was not adjusted, i.e. no step b) was carried out.

The filtration resistance of the pH adjusted mother liquor was $500*10^{12}$ mPa*s/m$^2$ as determined as described in Reference Example 3 hereinabove.

The filter cake was then washed with de-ionized water until the washing water had a conductivity of less than 300 microSiemens/cm.

The washing resistance of the filter cake was $3300*10^{12}$ mPa*s/m$^2$ as determined as described in Reference Example 3 hereinabove.

Calcination was carried out as described in Example 1.

The obtained zeolitic material BMWW had a boron content of 2 weight-%, a silicon content of 39 weight-%, a total organic carbon (TOC) content of <0.1 weight-% and a crystallinity of 85%, determined by XRD according according to Reference Example 1. The BET specific surface area determined via nitrogen adsorption at 77 K according to DIN 66131 was 330 m$^2$/g.

EXAMPLE 3

Preparation of Boron-Containing MWW (BMWW) with pH Adjustment a) Hydrothermal Synthesis 480 kg de-ionized water were provided in a vessel. Under stirring at 70 rpm (rounds per minute), 166 kg boric acid were suspended in the water. The suspension was stirred for another 3 h. Subsequently, 278 kg piperidine were added, and the mixture was stirred for another hour. To the resulting solution, 400 kg Ludox® AS-40 were added, and the resulting mixture was stirred at 70 rpm for another hour.

In this synthesis mixture, the boron source boric acid, calculated as elemental boron, relative to the silicon source Ludox® AS-40, calculated as elemental silicon, was present in a molar ratio of 1:1; the water relative to the silicon source Ludox® AS-40, calculated as elemental silicon, was present in a molar ratio of 10:1; and the template compound piperidine relative to the silicon source Ludox® AS-40, calculated as elemental silicon, was present in a molar ratio of 1.2:1.

The finally obtained mixture was transferred to a crystallization vessel and heated to 175° C. within 5 h under autogenous pressure and under stirring (50 rpm). The temperature of 175° C. was kept essentially constant for 60 h; during these 60 h, the mixture was stirred at 50 rpm. Subsequently, the mixture was cooled to a temperature of from 50-60° C. within 5 h.

The mother liquor containing the crystallized BMWW precursor had a pH of 11.3 as determined via measurement with a pH electrode.

b) pH Adjustment

To the mother liquor obtained in a), 1400 kg of a 10 weight-% HNO$_3$ aqueous solution were added under stirring at 50 r.p.m. (rounds per minute). The adding was carried out at a temperature of the suspension of 40° C.

After the addition of the 10 weight-% HNO$_3$ aqueous solution, the resulting suspension was further stirred for 5 h under stirring at 50 r.p.m. at a temperature of the suspension of 40° C.

The pH of the thus pH-adjusted mother liquor as determined via measurement with a pH electrode was 7.

The Dv10 value of the particles contained in the pH-adjusted mother liquor, as determined as described in Reference Example 2 hereinabove, was 3.0 micrometer, the respective Dv50 value was 4.9 micrometer, and the respective Dv90 value was 8.1 micrometer.

c) Separation

From the pH-adjusted mother liquor obtained in b), the B-MWW precursor was separated by filtration using different types of filtration devices (suction filter with filter material Sefar Tetex® Mono 24-1100-SK 012, centrifugal filter, candle filter). For all filtration devices, the filtration resistance of the pH-adjusted mother liquor obtained in b) was (30+/−10) mPa*s/m$^2$ as determined as described in Reference Example 3 hereinabove.

The filter cake was then washed with de-ionized water until the washing water had a conductivity of less than 200 microSiemens/cm.

The washing resistance of the filter cakes was (30+/−10) mPa*s/m$^2$ as determined as described in Reference Example 3 hereinabove.

d) Spray-Drying and Calcination

From the washed filter cake obtained according to Example 1 an aqueous suspension was prepared having a solids content of 15 weight-%. This suspension was subjected to spray-drying in a spray-tower with the following spray-drying conditions:

drying gas, nozzle gas: technical nitrogen
temperature drying gas:
    temperature spray tower (in): 270-340° C.
    temperature spray tower (out): 150-167° C.
    temperature filter (in): 140-160° C.
    temperature scrubber (in): 50-60° C.
    temperature scrubber (out): 34-36° C.
pressure difference filter: 8.3-10.3 mbar
nozzle:
    two-component nozzle supplier Gerig; size 0
    nozzle gas temperature: room temperature
    nozzle gas pressure: 2.5 bar
operation mode: nitrogen straight
apparatus used: spray tower with one nozzle
configuration: spray tower—filter—scrubber
gas flow: 1900 kg/h filter material: Nomex® needle-felt 20 m$^2$
dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 650° C. in a rotary calciner with a throughput in the range of from 0.8 to 1.0 kg/h.

The obtained zeolitic material BMWW had a boron content of 1.3 weight-%, a silicon content of 45 weight-%, a total organic carbon (TOC) content of <0.1 weight-% and a crystallinity of 82%, determined by XRD. The BET specific surface area determined via nitrogen adsorption at 77 K according to DIN 66131 was 463 m$^2$/g, the pore volume determined according to Hg porosimetry according to DIN 66133 was 5.2 mL/g, the particle size distribution Dv10 was 5.7 micrometer, Dv50 was 10.56 micrometer, and Dv90 was 18.8 micrometer, determined as described in Reference Example 4.

RESULTS OF THE EXAMPLES AND COMPARATIVE EXAMPLES

The comparison between the preparations of Example 1 and Comparative Example 1, and of Example 2 and Comparative Example 2, respectively, clearly shows that by the inventive pH adjustment of the mother liquor which is obtained from the hydrothermal crystallization of the BMWW precursor, regardless whether or not seeding material is added for hydrothermal crystallization purposes, a remarkable decrease in filtration resistance (from 100*10$^{12}$ mPa*s/m$^2$ to 30*10$^{12}$ mPa*s/m$^2$; and from 500*10$^{12}$ mPa*s/m$^2$ to 100*10$^{12}$ mPa*s/m$^2$, respectively) as well as in washing resistance (from 2,500*10$^{12}$ mPa*s/m$^2$ to 30*10$^{12}$ mPa*s/m$^2$; and from 3,300*10$^{12}$ mPa*s/m$^2$ to 90*10$^{12}$ mPa*s/m$^2$, respectively) could be achieved. Especially concerning the washing resistance, a major improvement was obtained. Consequently, due to this decrease, for a given mother liquor containing a hydrothermally crystallized BMWW precursor, the filtration time as well as the washing time can be significantly reduced by adjusting the pH. Therefore, the inventive pH adjustment allows for an easier and quicker preparation process which is of interest in particular in an industrial-scale process for the preparation of BMWW.

Without wanting to be bound to any theory, it is believed that this improvement could be due to the increase in size of the solid material contained in the mother liquor obtained from the hydrothermal synthesis of the BMWW precursor. This increase in size is illustrated, for example, by the measurement of the particle size distribution characterized by the respective Dv10, Dv50, and Dv90 values. Based on the respective measurements referred to in the description of FIGS. 10 and 11 FIGS. 10A-10C and 11A-11C which in turn relate to the process for the preparation of BMWW according to the teaching of Example 3, the following increase was observed (the respective values of the particle size distributions 10A and 11A, 10B and 11B, and 10C and 11C were compared:

|  | increase in % | | |
|---|---|---|---|
|  | Dv10 | Dv50 | Dv90 |
| 10A relative to 11A | 4.5 | 6.7 | 16.2 |
| 10B relative to 11B | 8.0 | 6.7 | 12.8 |
| 10C relative to 11C | 9.9 | 4.6 | 7.0 |

SHORT DESCRIPTION OF THE FIGURES

FIG. 1 shows a 20000:1 SEM (Scanning Electron Microscopy) picture (secondary electron (SE) picture at 5 kV (kiloVolt)) of the spray-dried and calcined B-MWW material as obtained according to Example 1. The scale is indicated in the lower right hand corner by the rule having a length of 1 micrometer.

Figure 2:
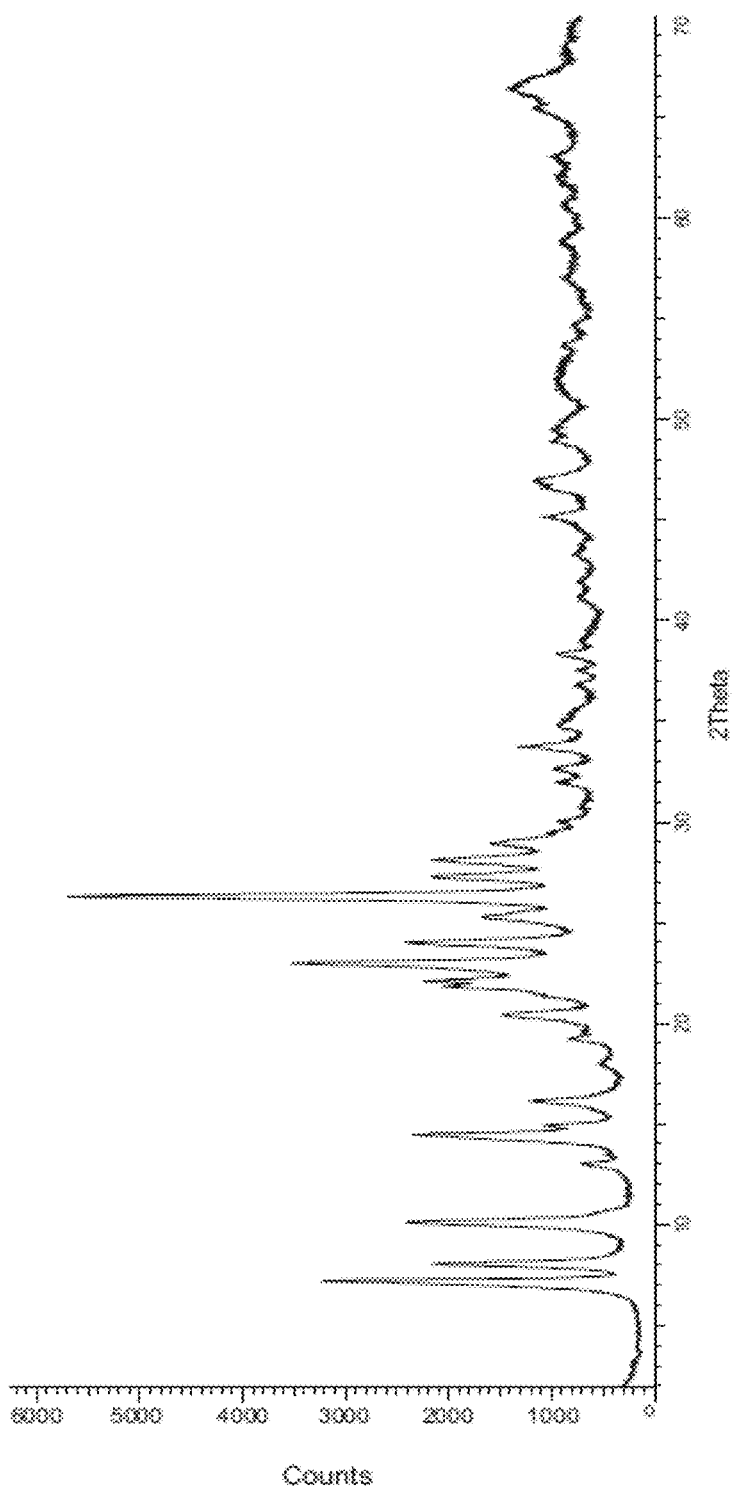
FIG. 2 shows the X-ray diffraction pattern (copper K alpha radiation) of the spray-dried and calcined B-MWW material as obtained according to Example 1.

FIG. 2 shows the X-ray diffraction pattern (copper K alpha radiation) of the spray-dried and calcined B-MWW material as obtained according to Example 1. On the x axis, the degree values (2 Theta) are shown, on the y axis, the intensity (Lin (Counts)).

Figure 3:
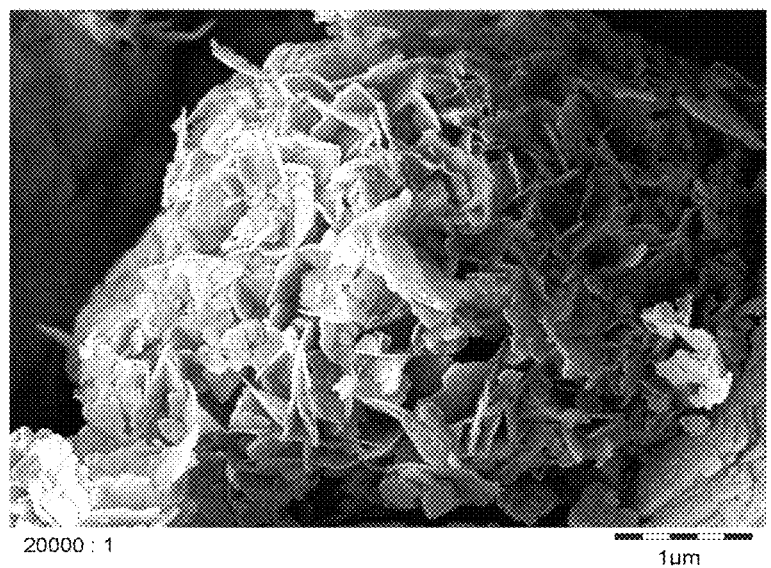
FIG. 3 shows a 20000:1 Scanning Electron Microscopy picture (secondary electron picture at 5 kV) of the spray-dried and calcined B-MWW material as obtained according to Comparative Example 1.

FIG. 3 shows a 20000:1 SEM (Scanning Electron Microscopy) picture (secondary electron (SE) picture at 5 kV (kiloVolt)) of the spray-dried and calcined B-MWW material as obtained according to Comparative Example 1. The scale is indicated in the lower right hand corner by the rule having a length of 1 micrometer.

Figure 4:
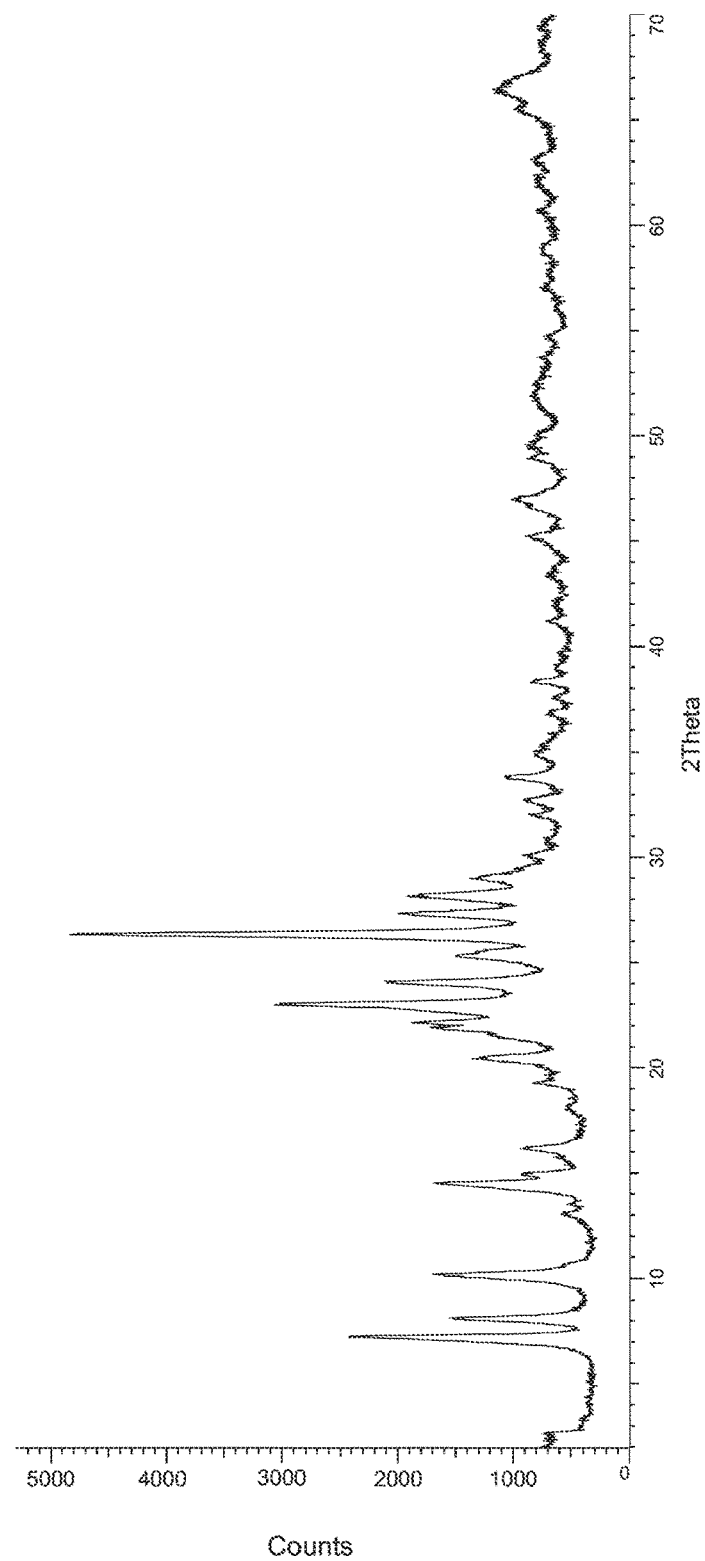
FIG. 4 shows the X-ray diffraction pattern (copper to K alpha radiation) of the spray-dried and calcined B-MWW material as obtained according to a Comparative Example 1.

FIG. 4 shows the X-ray diffraction pattern (copper K alpha radiation) of the spray-dried and calcined B-MWW material as obtained according to Comparative Example 1. On the x axis, the degree values (2 Theta) are shown, on the y axis, the intensity (Lin (Counts)).

Figure 5:
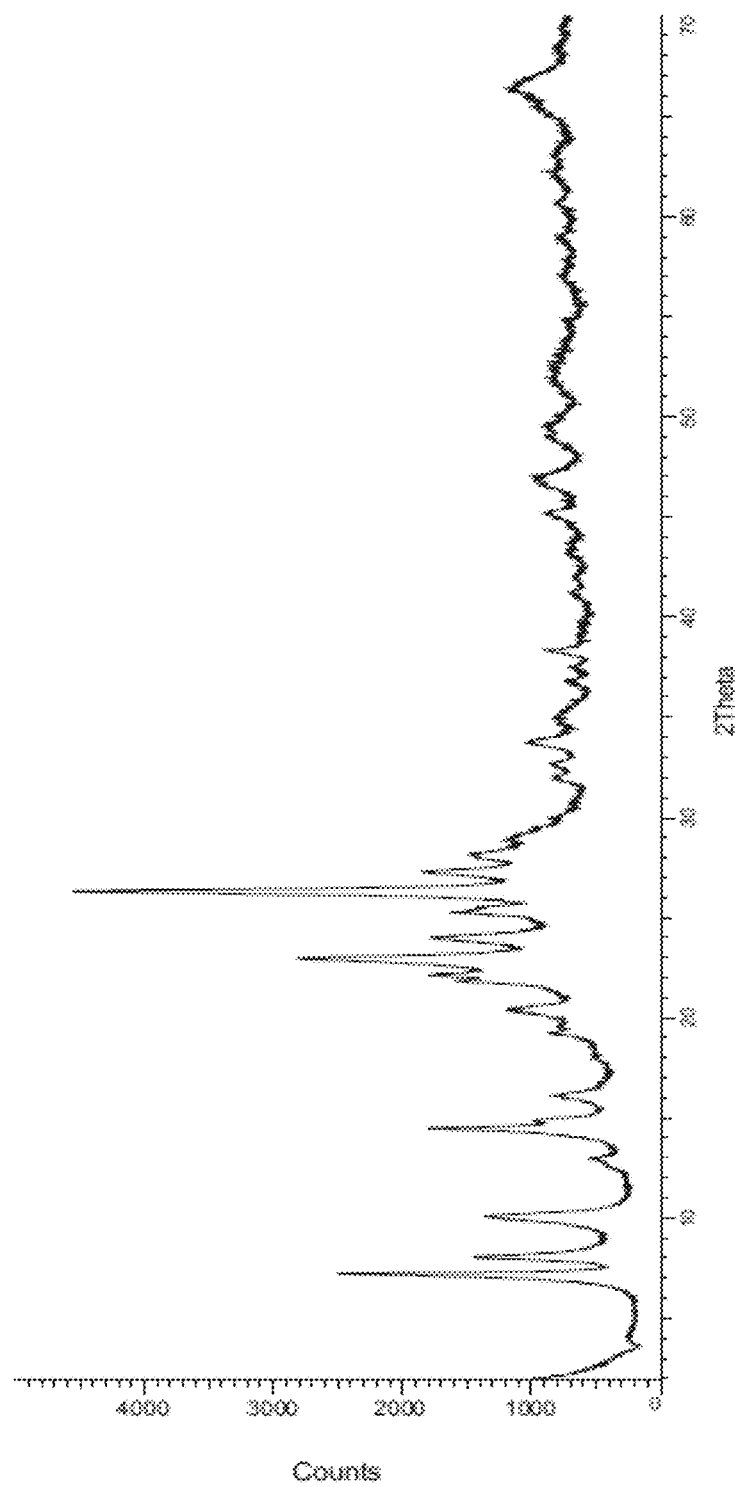
FIG. 5 shows the X-ray diffraction pattern (copper K alpha radiation) of the spray-dried and calcined B-MWW material as obtained according to Example 2.

FIG. 5 shows the X-ray diffraction pattern (copper K alpha radiation) of the spray-dried and calcined B-MWW material as obtained according to Example 2. On the x axis, the degree values (2 Theta) are shown, on the y axis, the intensity (Lin (Counts)).

Figure 6:
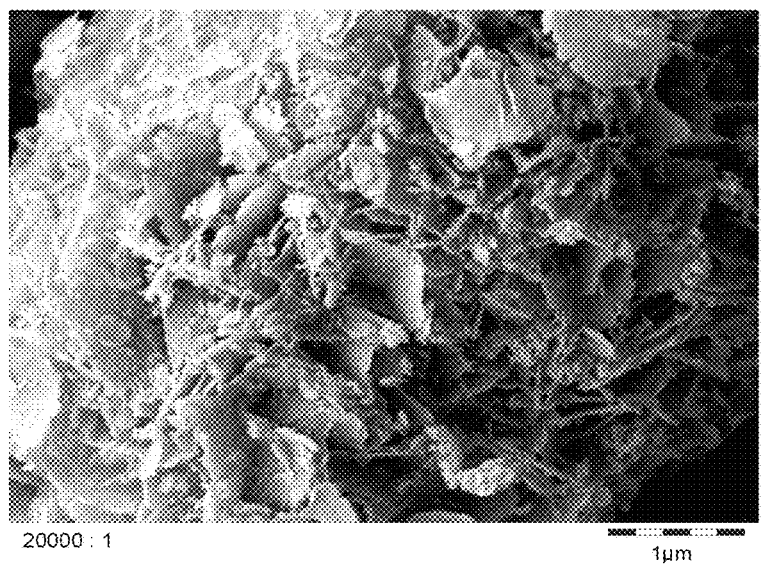
FIG. 6 shows a 20000:1 Scanning Electron Microscopy picture (secondary electron picture at 5 kV) of the spray-dried and calcined B-MWW material as obtained according to Comparative Example 2.

FIG. 6 shows a 20000:1 SEM (Scanning Electron Microscopy) picture (secondary electron (SE) picture at 5 kV (kiloVolt)) of the spray-dried and calcined B-MWW material as obtained according to Comparative Example 2. The scale is indicated in the lower right hand corner by the rule having a length of 1 micrometer.

Figure 7:
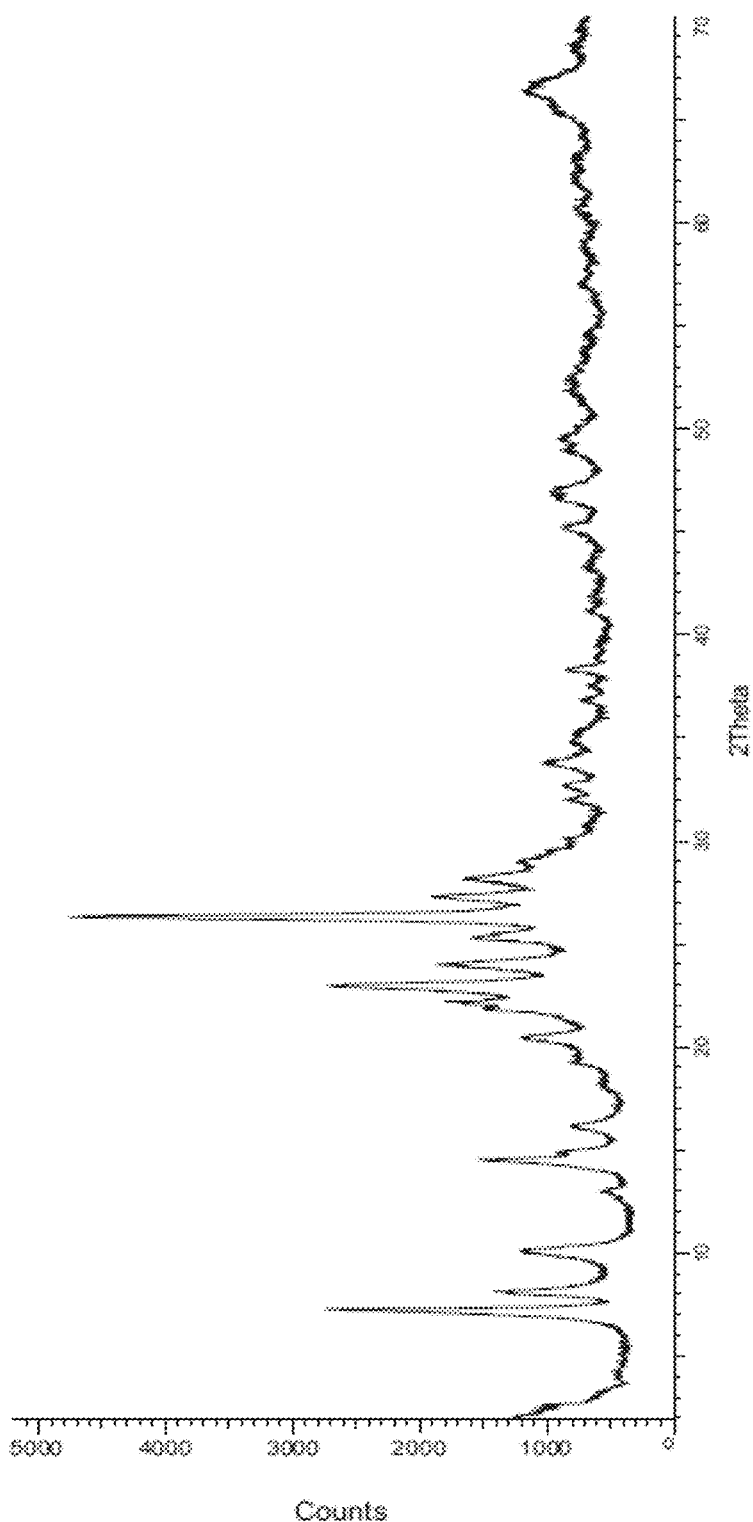
FIG. 7 shows the X-ray diffraction pattern (copper K alpha radiation) of the spray-dried and calcined B-MWW material as obtained according to Comparative Example 2.

FIG. 7 shows the X-ray diffraction pattern (copper K alpha radiation) of the spray-dried and calcined B-MWW material as obtained according to Comparative Example 2. On the x axis, the degree values (2 Theta) are shown, on the y axis, the intensity (Lin (Counts)).

Figure 8:
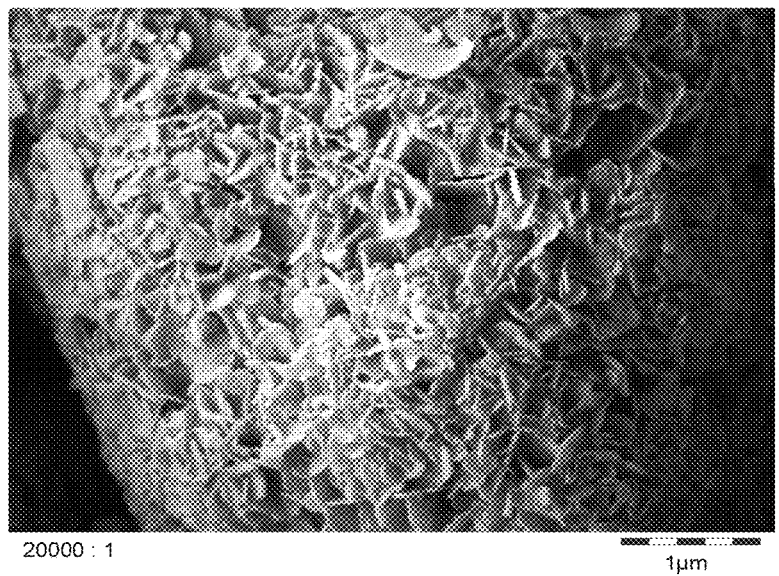
FIG. 8 shows a 20000:1 Scanning Electron Microspy picture (secondary electron Picture at 5 kV) of the spray-dried and calcined B-MWW material as obtained according to Example 3.

FIG. 8 shows a 20000:1 SEM (Scanning Electron Microscopy) picture (secondary electron (SE) picture at 5 kV (kiloVolt)) of the spray-dried and calcined B-MWW material as obtained according to Example 3. The scale is indicated in the lower right hand corner by the rule having a length of 1 micrometer.

Figure 9:
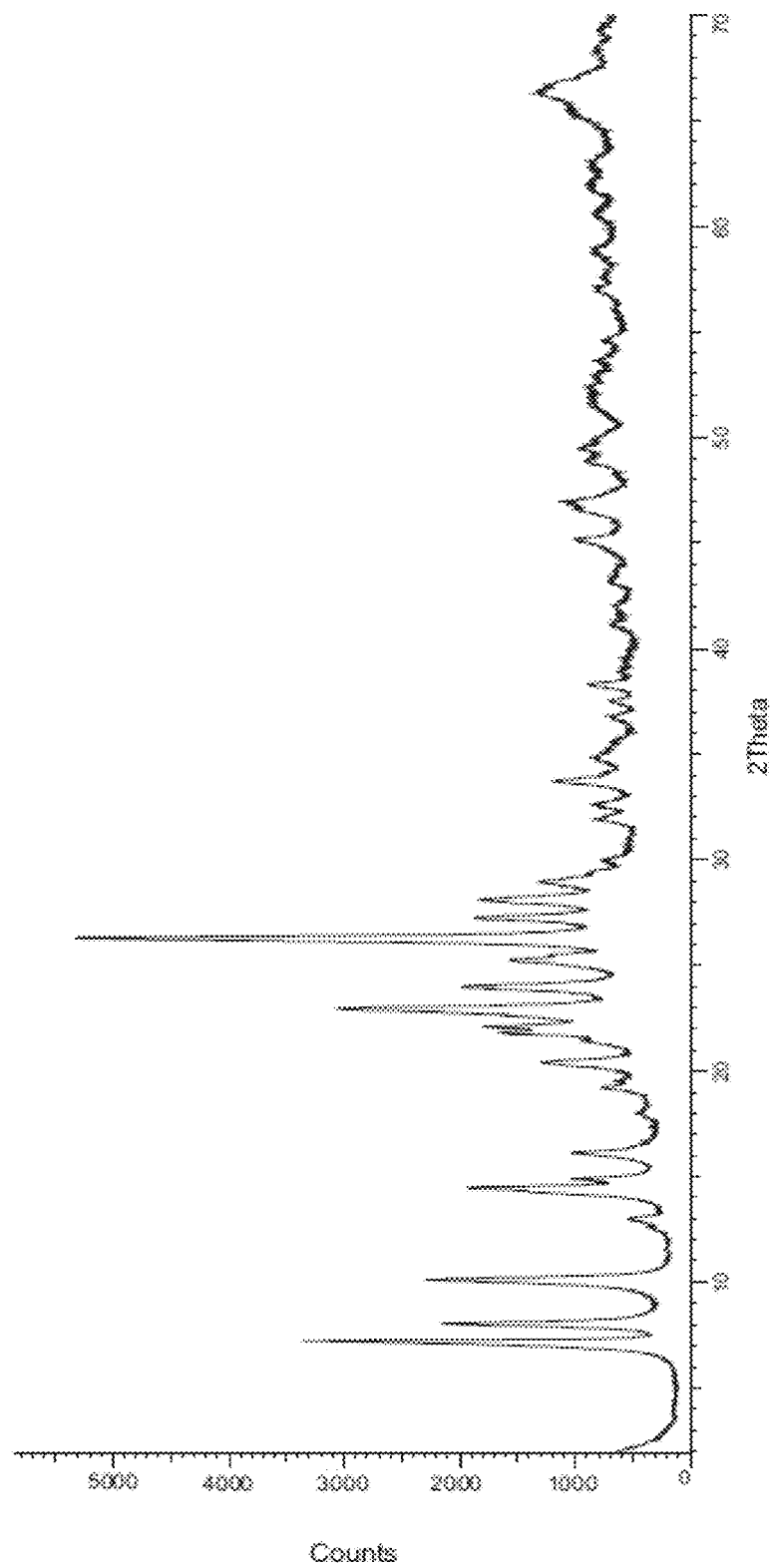
FIG. 9 the X-ray diffraction pattern (copper K alpha radiation) of the spray-dried and calcined B-MWW material as obtained according to Example 3.
Figure 10A:
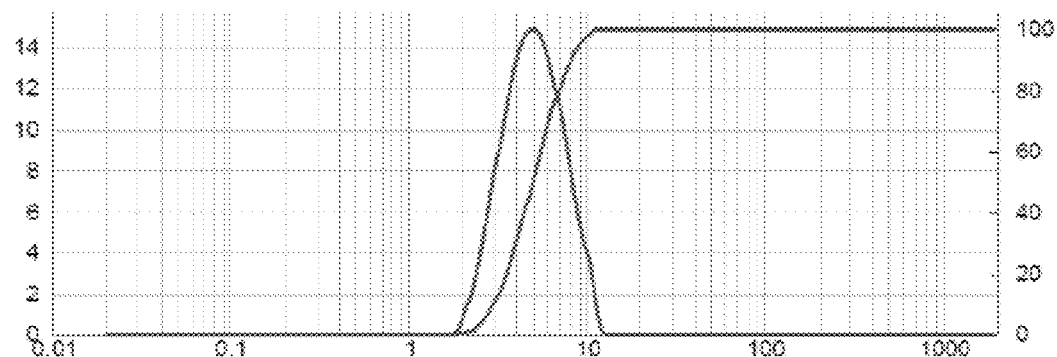
FIG. 10A shows the result of the determination of the Dv10, Dv50, and Dv90 values of the solid material particles contained in a first mother liquor as obtained according to the recipe of Example 3.
Figure 10B:
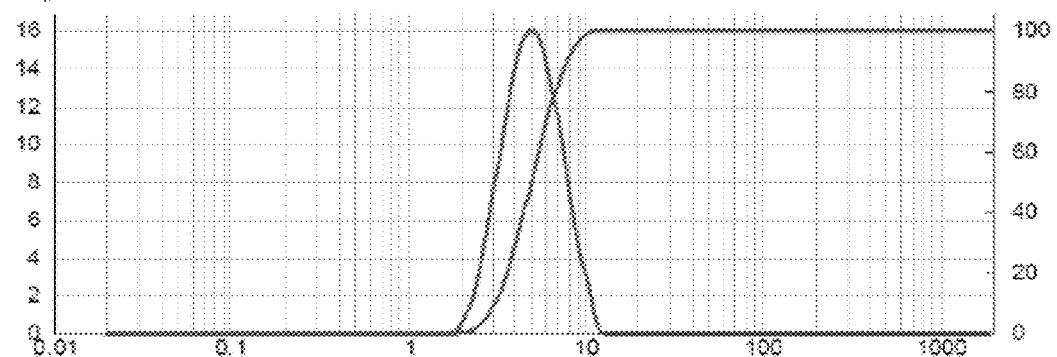
FIG. 10B shows the result of the determination of the Dv10, Dv50, and Dv90 values of the solid material particles contained in a second mother liquor as obtained according to the recipe of Example 3.
Figure 10C:
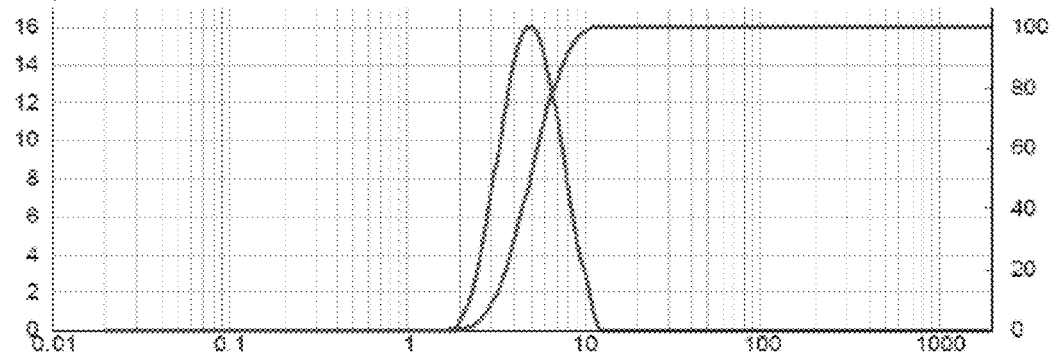
FIG. 10C shows the result of the determination of the Dv10, Dv50, and Dv90 values of the solid material particles contained in a third mother liquor as obtained according to the recipe of Example 3.
Figure 11A:
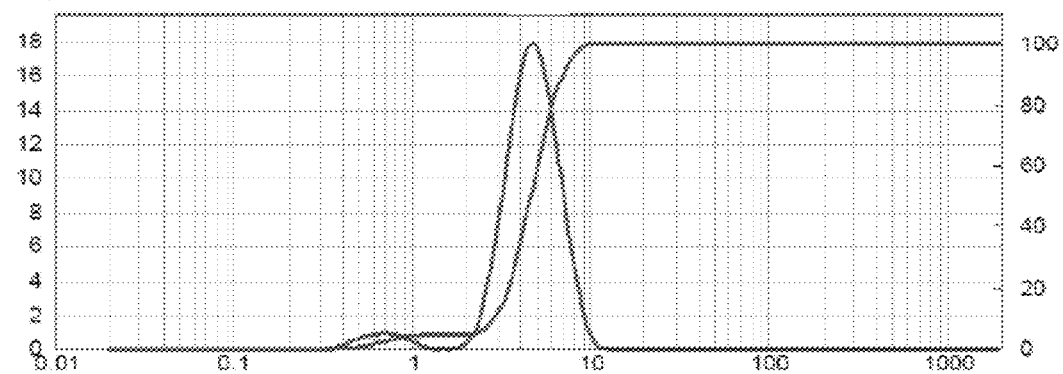
FIG. 11A shows the result of the determination of the Dv10, Dv50, and Dv90 values of the solid material particles contained in the first mother liquor as obtained according to Example 3 where the pH of the mother liquor was not adjusted.
Figure 11B:
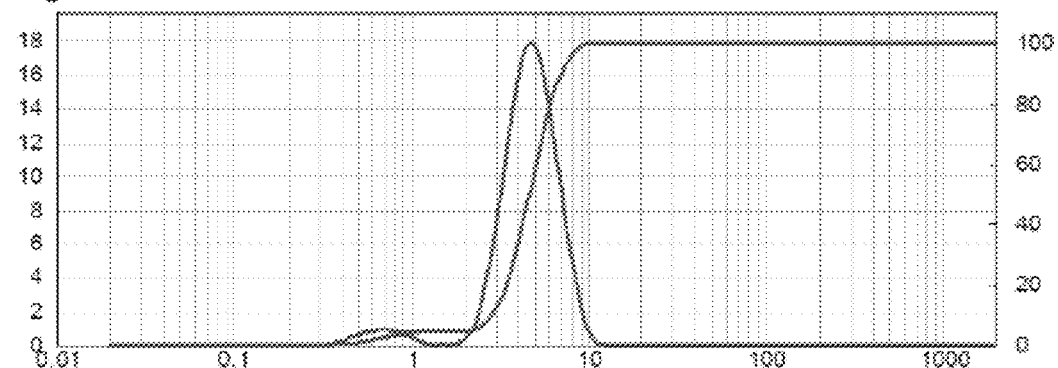
FIG. 11B shows the result of the determination of the Dv10, Dv50, and Dv90 values of the solid material particles contained in the second mother liquor as obtained according to Example 3 where the pH of the mother liquor was not adjusted.
Figure 11C:
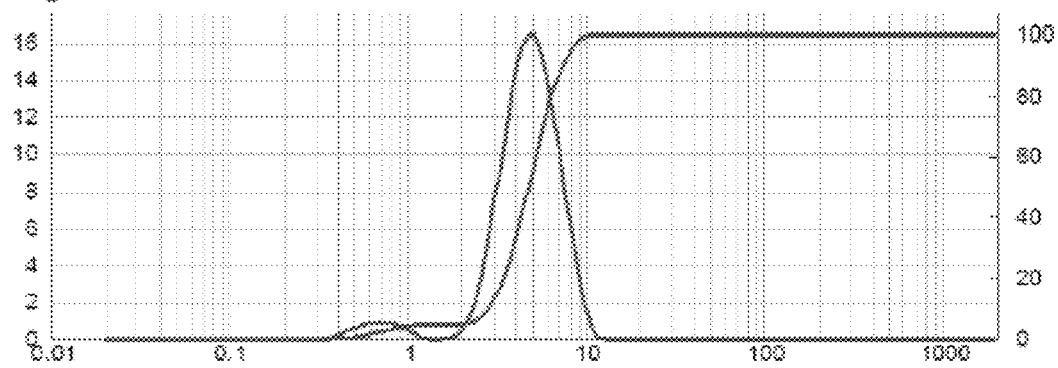
FIG. 11C shows the result of the determination of the Dv10, Dv50, and Dv90 values of the solid material particles contained in the third mother liquor as obtained according to Example 3 where the pH of the mother liquor was not adjusted.

FIG. 9 shows the X-ray diffraction pattern (copper K alpha radiation) of the spray-dried and calcined B-MWW material as obtained according to Example 3. On the x axis, the degree values (2 Theta) are shown, on the y axis, the intensity (Lin (Counts)).

FIG. 10 shows the result of the determination of the Dv10, Dv50, and Dv90 values of the solid material particles contained in a typical mother liquor as obtained according to the recipe of Example 3. As to the parameters used for the determination, reference is made to Reference Example 2. On the x axis of each of the graphs 10A, 10B, and 10C, the particle diameter/micrometer is shown. On the left and right y axis, the volume-% of the particles is shown. The values of the left y axis refer to the distribution containing the peak whereas the values of the right y axis refer to the distribution as indicated by the integral curve. The Dv10, Dv50, and Dv90 values of the individual measurement according to 10A, 10B, and 10C were as follows:

|  | Dv10/ micrometer | Dv50/ micrometer | Dv90/ micrometer |
|---|---|---|---|
| 10A | 3.02 | 4.97 | 8.16 |
| 10B | 3.11 | 4.97 | 7.92 |
| 10C | 3.11 | 4.97 | 7.91 |

FIG. 11 shows the result of the determination of the Dv10, Dv50, and Dv90 values of the solid material particles contained in a typical mother liquor as obtained according to Example 3 where the pH of the mother liquor was not adjusted. As to the parameters used for the determination, reference is made to Reference Example 2. On the x axis of each of the graphs 11A, 11B, and 11C, the particle diameter/micrometer is shown. On the left and right y axis, the volume-% of the particles is shown. The values of the lefty axis refer to the distribution containing the peak whereas the values of the right y axis refer to the distribution as indicated by the integral curve. The Dv10, Dv50, and Dv90 values of the individual measurement according to 11A, 11B, and 11C were as follows:

|  | Dv10/ micrometer | Dv50/ micrometer | Dv90/ micrometer |
|---|---|---|---|
| 11A | 2.89 | 4.66 | 7.02 |
| 11B | 2.88 | 4.66 | 7.02 |
| 11C | 2.83 | 4.75 | 7.39 |

CITED LITERATURE

WO 03/074421 A1
WO 03/074422 A1

The invention claimed is:

1. An aluminum-free boron containing zeolitic material comprising the framework structure MWW (BMWW), obtained by a process comprising
   (a) hydrothermally synthesizing a BMWW precursor from a synthesis mixture containing water, a silicon source, a boron source, and an MWW template compound obtaining the BMWW precursor in its mother liquor, the mother liquor having a pH above 9;
   (b) adjusting the pH of the mother liquor, obtained in (a) and containing the BMWW precursor, to a value in the range of from 6 to 9; and
   (c) separating the BMWW precursor from the pH-adjusted mother liquor obtained in (b) by filtration in a filtration device,
   wherein the BMWW has boron content in the range of from 1.0 to 2.2 weight-%, calculated as elemental boron and based on the total weight of the BMWW, a silicon content of at least 37 weight-%, calculated as elemental silicon and based on the total weight of the BMWW, a degree of crystallinity of at least (80 ±5) %, as determined via XRD, and a BET specific surface area of at least 300 m$^2$/g, as determined according to DIN 66131.

2. The BMWW of claim 1, wherein the BET specific surface area is in the range of from 300 to 500 m$^2$/g, as determined according to DIN 66131.

3. A catalyst, a catalyst support, or a catalyst precursor, comprising the aluminum-free boron containing zeolitic material according to claim 1.

4. The catalyst, catalyst support, or catalyst precursor according to claim 3, which is suitable as a catalyst precursor for the preparation of a titanium containing zeolitic catalyst.

5. The catalyst, catalyst support, or catalyst precursor according to claim 3, which is suitable as a catalyst precursor for the preparation of a zinc and titanium containing zeolitic catalyst.

* * * * *

UNITED STATES PATENT AND TRADEMARK OFFICE
CERTIFICATE OF CORRECTION

PATENT NO. : 10,442,697 B2
APPLICATION NO. : 16/007724
DATED : October 15, 2019
INVENTOR(S) : Andrei-Nicolae Parvulescu et al.

It is certified that error appears in the above-identified patent and that said Letters Patent is hereby corrected as shown below:

In the Specification

In Column 2, Line 42, "spray- dried" should read -- spray-dried --.

In Column 2, Line 48, "(copper to" should read -- (copper --.

In Column 2, Line 50, "to a" should read -- to --.

In Column 2, Line 61, "Microspy" should read -- Microscopy --.

In Column 2, Line 62, "Picture" should read -- picture --.

In Column 2, Line 65, "9" should read -- 9 shows --.

In Column 7, Line 14, "as large" should read -- large --.

In Column 11, Line 58, "s/m²" should read -- s/m². --.

In Column 14, Line 56, "continous" should read -- continuous --.

In Column 17, Line 43, "(80 ±5)" should read -- (80 ± 5) --.

In Column 24, Line 46, "m)" should read -- m). --.

In Column 24, Line 59, "m)" should read -- m). --.

In Column 26, Line 7, "according according" should read -- according --.

In Column 26, Line 43, "the the" should read -- the --.

Signed and Sealed this
Second Day of June, 2020

Andrei Iancu
*Director of the United States Patent and Trademark Office*

CERTIFICATE OF CORRECTION (continued)
U.S. Pat. No. 10,442,697 B2

In Column 26, Line 46, "wt.%" should read -- wt-% --, therefor.

In Column 27, Lines 11-12, "according according" should read -- according --.

In Column 27, Lines 42-43, "according according" should read -- according --.

In Column 29, Line 65, "FIGS. 10 and 11 FIGS." should read -- FIGS. --.

In Column 30, Line 3, "compared:" should read -- compared): --.

In Column 31, Line 30, "lefty" should read -- left y --.

In the Claims

In Column 32, Line 25 approx., Claim 1, "(80 ±5)" should read -- (80 ± 5) --.